(12) United States Patent
Mimura et al.

(10) Patent No.: US 12,244,932 B2
(45) Date of Patent: Mar. 4, 2025

(54) IMAGING CONTROL APPARATUS, IMAGING CONTROL METHOD, AND PROGRAM

(71) Applicant: Sony Group Corporation, Tokyo (JP)

(72) Inventors: Yusuke Mimura, Saitama (JP); Kenichiro Adachi, Aichi (JP)

(73) Assignee: Sony Group Corporation, Tokyo (JP)

( * ) Notice: Subject to any disclaimer, the term of this patent is extended or adjusted under 35 U.S.C. 154(b) by 204 days.

(21) Appl. No.: 17/923,067

(22) PCT Filed: Jan. 13, 2021

(86) PCT No.: PCT/JP2021/000850
§ 371 (c)(1),
(2) Date: Nov. 3, 2022

(87) PCT Pub. No.: WO2021/255970
PCT Pub. Date: Dec. 23, 2021

(65) Prior Publication Data
US 2023/0179869 A1    Jun. 8, 2023

(30) Foreign Application Priority Data

Jun. 17, 2020    (JP) .................................. 2020-104882

(51) Int. Cl.
 *H04N 23/73*  (2023.01)
 *G03B 7/093*  (2021.01)
 *H04N 23/71*  (2023.01)

(52) U.S. Cl.
CPC ............. *H04N 23/73* (2023.01); *G03B 7/093* (2013.01); *H04N 23/71* (2023.01)

(58) Field of Classification Search
CPC ........ H04N 23/73; H04N 23/71; H04N 23/61; H04N 23/72; G03B 7/093; G03B 7/091
See application file for complete search history.

(56) References Cited

U.S. PATENT DOCUMENTS 8,432,458 B2 *   4/2013   Hirooka .............. H04N 23/611
                                                    348/222.1
8,477,995 B2 *   7/2013   Porter .................. H04N 13/207
                                                    382/103
(Continued)

FOREIGN PATENT DOCUMENTS

JP    2008035415 A    2/2008
JP    2008070562 A    3/2008
(Continued)

OTHER PUBLICATIONS

International Search Report (PCT/ISA/210), International Application No. PCT/JP2021/000850, dated Apr. 6, 2021.

*Primary Examiner* — Chiawei Chen
(74) *Attorney, Agent, or Firm* — Michael Best & Friedrich LLP

(57) ABSTRACT

In one example, an imaging apparatus includes an exposure controller that performs exposure control on the basis of information of a region of interest detected from a captured image by a region-of-interest detector. The exposure controller performs different exposure control for different cases, such as whether the region of interest is detected from the captured image. It obtains an exposure correction value on the basis of the region-of-interest exposure target value before a time of region-of-interest lost, and then performs exposure control with the exposure control value obtained by correcting the set region exposure target value with the exposure correction value, in a predetermined period in which the region of interest is not detected continuously from the time of the region-of-interest lost in which the region of interest is not detected from the captured image.

19 Claims, 17 Drawing Sheets

(56) References Cited

U.S. PATENT DOCUMENTS

| | | |
|---|---|---|
| 2010/0171836 A1 | 7/2010 | Matsuno |
| 2013/0027581 A1 | 1/2013 | Price |
| 2016/0205307 A1 | 7/2016 | Kosaka |
| 2017/0324909 A1* | 11/2017 | Choi ..................... H04N 23/74 |
| 2018/0167545 A1* | 6/2018 | Kosaka .................. G06V 40/16 |
| 2021/0306543 A1* | 9/2021 | Kogure ................ H04N 23/611 |
| 2021/0329158 A1* | 10/2021 | Ichikawa ............... H04N 23/62 |
| 2021/0385366 A1* | 12/2021 | Satou ..................... H04N 23/73 |

FOREIGN PATENT DOCUMENTS

| | | |
|---|---|---|
| JP | 2010093689 A | 4/2010 |
| JP | 5945444 B2 | 7/2016 |
| JP | 2018033013 A | 3/2018 |

\* cited by examiner

FIG. 6
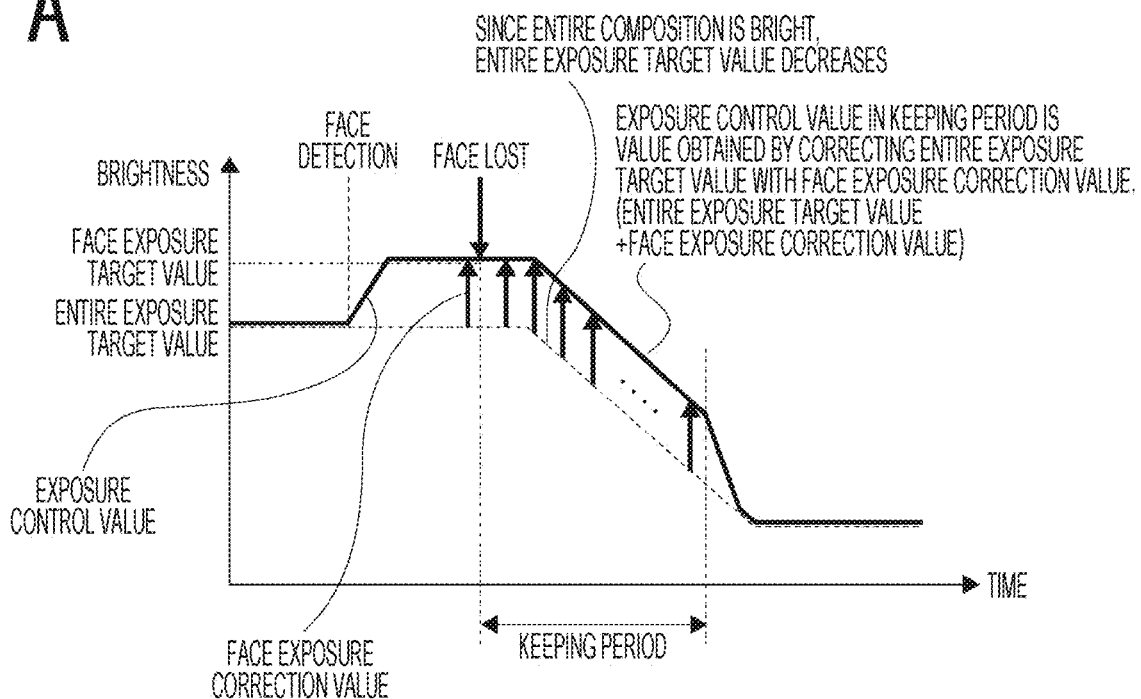
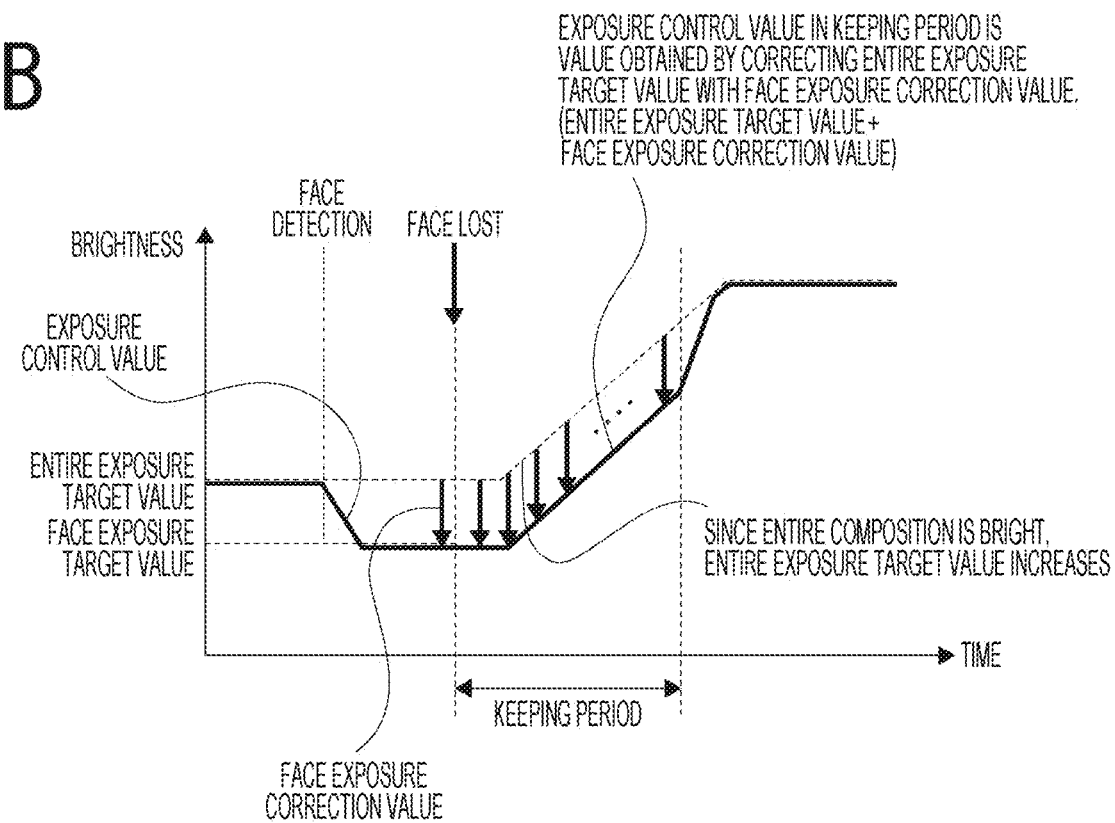

FIG. 11
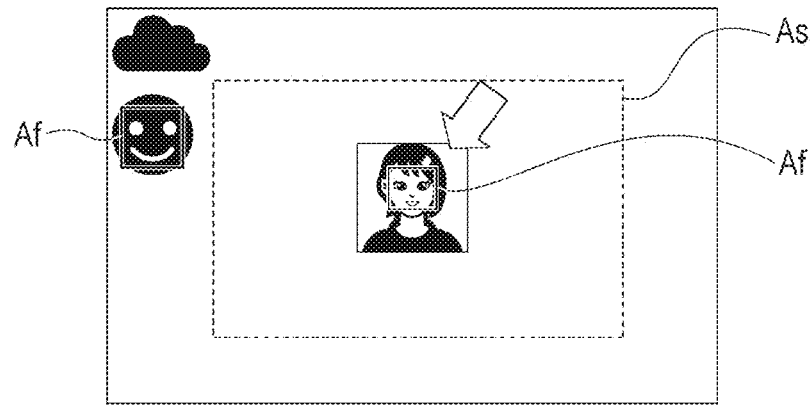
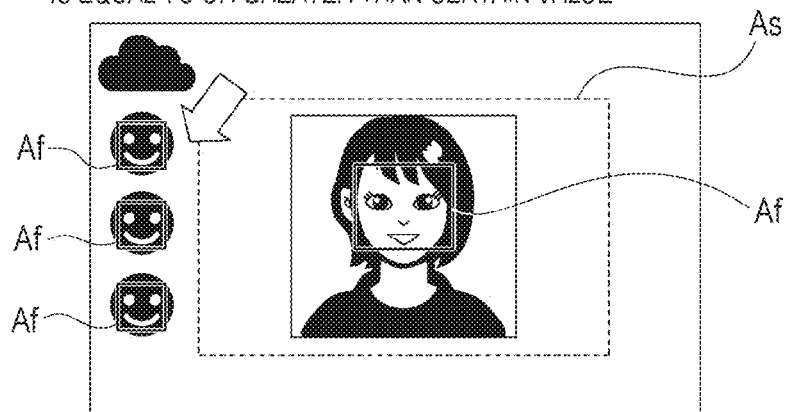
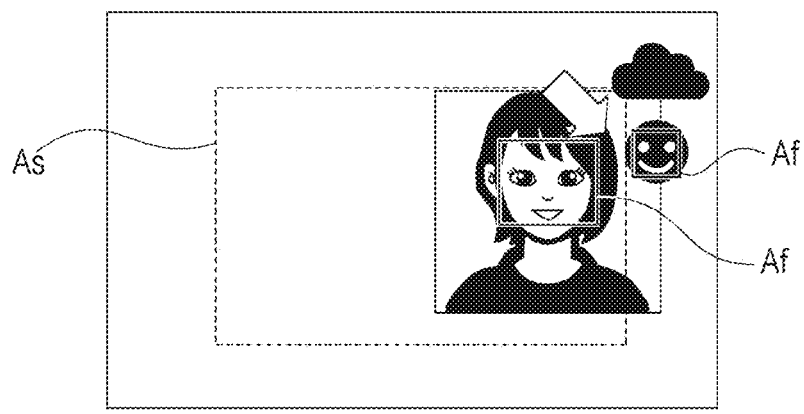

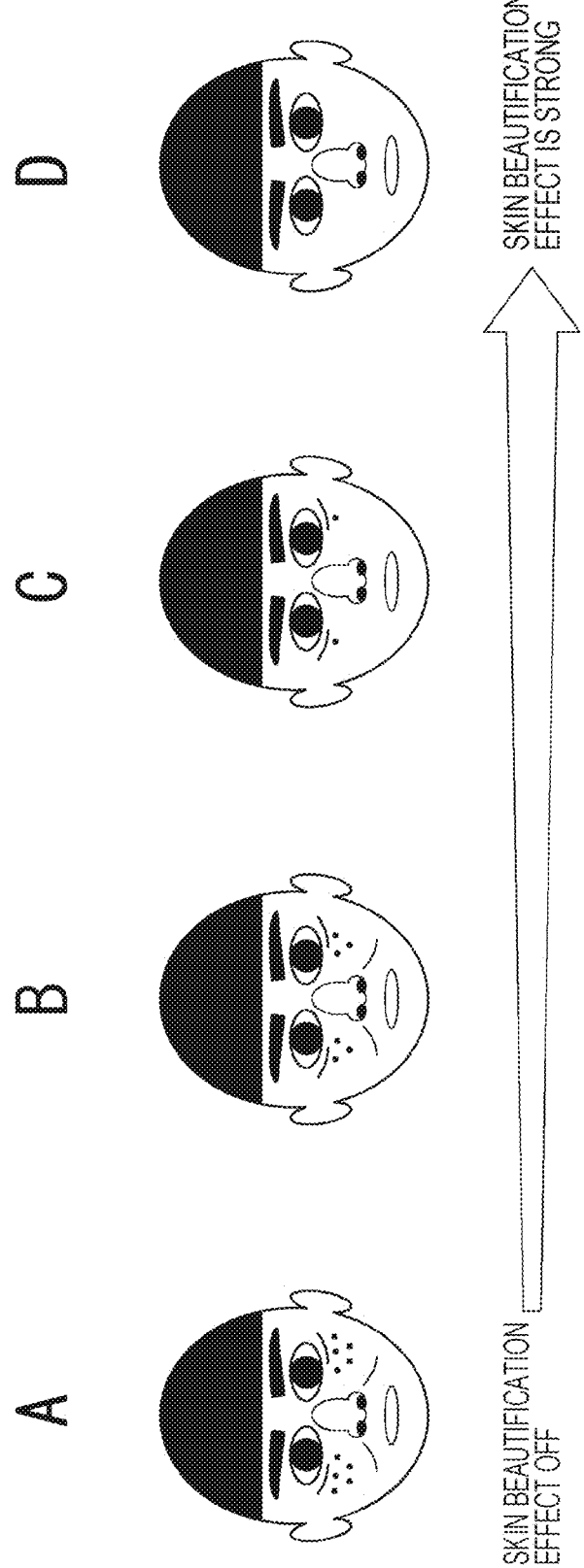

IMAGING CONTROL APPARATUS, IMAGING CONTROL METHOD, AND PROGRAM

TECHNICAL FIELD

The present technology relates to an imaging apparatus and relates to a setting for imaging.

BACKGROUND ART

There is known a technology of performing processing related to various imaging, such as exposure control for an image captured by an imaging apparatus.

CITATION LIST

Patent Document

Patent Document 1: Japanese Patent Application Laid-Open No. 2018-33013

SUMMARY OF THE INVENTION

Problems to be Solved by the Invention

Here, as the exposure control in the imaging apparatus, there is a technology of face auto exposure (AE) in which exposure control is performed such that a face region of a subject has appropriate brightness.

However, in the face AE, the control is performed on the assumption that a face is detected, and thus there is a possibility that appropriate exposure control cannot be performed when the face is not detected due to the subject facing sideways or other reasons.

Therefore, the present disclosure proposes a technology for improving a function of exposure control of the imaging apparatus.

Solutions to Problems

An imaging control apparatus according to the present technology includes an exposure control unit configured to perform exposure control on the basis of information of a region of interest detected from a captured image by a region-of-interest detection unit, in which the exposure control unit is configured to: perform exposure control in which a region-of-interest exposure target value calculated on the basis of a region-of-interest photometric value obtained from a first photometric region including at least a region of interest in an input frame is set as an exposure control value, in a case where the region of interest is detected from the captured image; perform exposure control in which a set region exposure target value calculated on the basis of a set region photometric value obtained from a second photometric region determined in advance in the input frame is set as the exposure control value, in a case where the region of interest is not detected from the captured image; and obtain an exposure correction value on the basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

The region of interest mentioned here means a region in which an object defined in advance as a target to be paid attention exists in the captured image. Examples of the object as a target in the region of interest include an independent object such as a person, an animal, a plant, a car, a train, an airplane, and furniture, and a specific portion in the independent object, for example, a face or hand of a person, a license plate of a car, and the like. According to the above-described configuration, for example, in a case where the exposure control is performed such that the region of interest has appropriate brightness as in the face auto exposure (face AE), when the region of interest is lost, in a predetermined period after that, the exposure control is performed with the exposure control value obtained by correcting the set region exposure target value with the exposure correction value obtained on the basis of the region-of-interest exposure target value before the time of the region-of-interest lost. Since the exposure control value obtained by correcting the set region exposure target value with the exposure correction value based on the region-of-interest exposure target value before the time of the region-of-interest lost is used as the exposure control value within a predetermined period after the region-of-interest lost, when there is no change in the brightness of the entire composition within a predetermined period, even after the region-of-interest lost, the brightness of the subject present in the region of interest can be appropriately maintained, and even when the brightness of the entire composition changes within the predetermined period, it is possible to prevent a situation in which the brightness change of the entire composition cannot be followed as in a case where the AE-lock is performed with the region-of-interest exposure target value before the time of the region-of-interest lost.

In the imaging control apparatus according to the present technology described above, the exposure correction value can be configured to be a value indicating the relationship between the set region exposure target value before the time of the region-of-interest lost and the region-of-interest exposure target value before the time of the region-of-interest lost.

According to this, in a predetermined period after the region-of-interest lost, the set region exposure target value can be corrected with the exposure target value so as to reproduce the relationship between the set region exposure target value before the time of the region-of-interest lost and the region-of-interest exposure target value before the time of the region-of-interest lost.

In the imaging control apparatus according to the present technology described above, in the predetermined period, the exposure control unit can be configured to perform exposure control with the exposure correction value obtained so as to make a specific numerical relationship between the set region exposure target value and the set region exposure target value corrected with the exposure correction value equivalent to the specific numerical relationship between the set region exposure target value before the time of the region-of-interest lost and the region-of-interest exposure target value before the time of the region-of-interest lost.

The "specific numerical relationship" mentioned herein means a specific numerical relationship among numerical relationships between two numerical values, and the "numerical relationship" means a numerical relationship such as a difference between two numerical values, a ratio between two numerical values. According to the above-described configuration, in a predetermined period after the region-of-interest lost, exposure control is performed such that a specific numerical relationship such as a difference or a ratio between the set region exposure target value and the set region exposure target value corrected with the exposure correction value is equivalent to a specific numerical relationship between the set region exposure target value before the time of region-of-interest lost and the region-of-interest exposure target value before time of the region-of-interest lost (so as to reproduce the relationship).

In the imaging control apparatus according to the present technology described above, the exposure correction value can be configured to be a difference value between the set region exposure target value before the time of the region-of-interest lost and the region-of-interest exposure target value before the time of the region-of-interest lost.

According to this, in a predetermined period after the region-of-interest lost, exposure control is performed such that a difference between the set region exposure target value and the set region exposure target value corrected with the exposure correction value is equivalent to a difference between the set region exposure target value before the time of region-of-interest lost and the region-of-interest exposure target value before time of the region-of-interest lost.

In the imaging control apparatus according to the present technology described above, in a case where the regions of interest are detected respectively inside and outside a specific region in the captured image by the region-of-interest detection unit, the exposure control unit can be configured to calculate the region-of-interest exposure target value used to calculate the exposure correction value on the basis of at least one of a size of the detected region of interest, the number of the detected regions of interest, or a position of the detected region of interest.

Regarding the region of interest detected outside the specific region, in a case where the region size is small, the number of the regions is small, or a distance from the region of interest detected inside the specific region is long, when the exposure target value for the region of interest is considered in calculating the exposure correction value, there is a possibility that the brightness of the subject in the region of interest detected inside the specific region cannot be made appropriate.

In the imaging control apparatus according to the present technology described above, in a case where the size of the region of interest detected outside the specific region is greater than a reference size, the exposure control unit can be configured to use the region-of-interest exposure target value calculated for the region of interest to calculate the exposure correction value, and in a case where the size of the region of interest detected outside the specific region is not greater than the reference size, the exposure control unit can be configured not to use the region-of-interest exposure target value calculated for the region of interest to calculate the exposure correction value.

According to this, regarding the region of interest detected outside the specific region, in a case where the size of the region of interest is great and the region of interest cannot be ignored in the correction of the set region exposure target value after the region-of-interest lost, the exposure target value of the region of interest can be used to calculate the exposure correction value, and conversely, in a case where the size is small and the region of interest can be ignored in the correction of the set region exposure target value after the region-of-interest lost, the exposure target value of the region of interest can be prevented from being used to calculate the exposure correction value.

In the imaging control apparatus according to the present technology described above, the reference size can be configured to be a size of a region of interest detected in the specific region.

According to this, whether or not to use the exposure target value of the region of interest detected outside the specific region for calculating the exposure correction value is determined on the basis of the relative size relationship of the region of interest detected inside/outside the specific region.

In the imaging control apparatus according to the present technology described above, in a case where the number of the regions of interest detected outside the specific region is greater than a threshold, the exposure control unit can be configured to use the region-of-interest exposure target value calculated for the region of interest detected outside the specific region to calculate the exposure correction value, and in a case where the number of the regions of interest detected outside the specific region is not greater than the threshold, the exposure control unit can be configured not to use the region-of-interest exposure target value calculated for the region of interest detected outside the specific region to calculate the exposure correction value.

According to this, regarding the region of interest detected outside the specific region, in a case where the number of the regions of interest is great and the region of interest outside the specific region cannot be ignored in the correction of the set region exposure target value after the region-of-interest lost, the exposure target value of the region of interest can be used to calculate the exposure correction value, and conversely, in a case where the number of the regions of interest is small and the region of interest outside the specific region can be ignored in the correction of the set region exposure target value after the region-of-interest lost, the exposure target value of the region of interest can be prevented from being used to calculate the exposure correction value.

In the imaging control apparatus according to present technology described above, in a case where, as the region of interest detected outside the specific region, there is the region of interest within a certain distance from the region of interest detected inside the specific region, the exposure control unit can be configured to use the region-of-interest exposure target value calculated for the region of interest to calculate the exposure correction value, and in a case where there is not the region of interest within a certain distance from the region of interest detected inside the specific region, the exposure control unit can be configured not to use the region-of-interest exposure target value calculated for the region of interest detected outside the specific region to calculate the exposure correction value.

According to this, regarding the region of interest detected outside the specific region, in a case of the region of interest at a distance close to the region of interest inside the specific region, in other words, the region of interest in which a brightness difference with the region of interest inside the specific region is likely to be conspicuous, the brightness difference occurring in a case where the exposure target value of the region of interest is not used to calculate the exposure correction value, the exposure target value of the region of interest can be used to calculate the exposure correction value, and conversely, in a case of the region of interest which is at a distance far from the region of interest inside the specific region and in which the brightness difference is not likely to be conspicuous, the exposure target value of the region of interest can be prevented from being used to calculate the exposure correction value.

In the imaging control apparatus according to the present technology described above, the exposure control unit can be configured to change the predetermined period on the basis of the size of the region of interest detected by the region-of-interest detection unit.

For example, in a case where the size of the region of interest is small, the region other than the region of interest is dominant as the composition, and when the predetermined period, that is, the exposure control period using the exposure correction value is long, there is a possibility that the period in which the exposure of the region other than the region of interest is not appropriate is long. In other words, there is a possibility that an unnatural exposure state continues for a long time as the entire composition. When the predetermined period is changed according to the size of the region of interest as described above, the predetermined period can be shortened in a case where the size of the region of interest is small, and it is possible to prevent an unnatural exposure state as the entire composition from continuing for a long time.

In the imaging control apparatus according to the present technology described above, the exposure control unit can be configured to change the predetermined period on the basis of the number of the regions of interest detected by the region-of-interest detection unit.

For example, in a case where the number of the regions of interest is small, the region other than the region of interest is dominant as the composition, and when a predetermined period, that is, the exposure control period using the exposure correction value is long, there is a possibility that the period in which the exposure of the region other than the region of interest is not appropriate is long. In other words, there is a possibility that an unnatural exposure state continues for a long time as the entire composition. When the predetermined period is changed according to the number of the regions of interest as described above, the predetermined period can be shortened in a case where the number of the regions of interest is small, and it is possible to prevent an unnatural exposure state as the entire composition from continuing for a long time.

In the imaging control apparatus according to the present technology described above, the exposure control unit can be configured to change the predetermined period on the basis of the number of times at which the region of interest is lost within a certain time.

For example, the fact that the number of times of the lost of the region of interest within a certain time is great means that the frequency of turning the face backward or turning around the face is high in a case where the region of interest is a face region of a person, and it can be said that the lost region of interest is highly likely to be detected again immediately after the lost of the region of interest. According to the above-described configuration, the predetermined period, that is, the exposure control period using the exposure correction value can be shortened corresponding to the case where the frequency of the region-of-interest lost is high as described above.

In the imaging control apparatus according to the present technology described above, the exposure control unit can be configured to change the predetermined period on the basis of a user's operation.

According to this, the duration of the exposure control using the exposure correction value after the region-of-interest lost can be set according to the user's preference.

An imaging control method according to the present technology is an imaging control method in which an imaging control apparatus, which performs exposure control on the basis of information of a region of interest detected from a captured image by a region-of-interest detection unit, is configured to: perform exposure control in which a region-of-interest exposure target value calculated on the basis of a region-of-interest photometric value obtained from a first photometric region including at least a region of interest in an input frame is set as an exposure control value, in a case where the region of interest is detected from the captured image; perform exposure control in which a set region exposure target value calculated on the basis of a set region photometric value obtained from a second photometric region determined in advance in the input frame is set as the exposure control value, in a case where the region of interest is not detected from the captured image; and obtain an exposure correction value on the basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

With such an information processing method, it is also possible to obtain effects similar to those of an information processing apparatus according to the present technology described above.

A program according to the present technology is a program readable by a computer device, the program causing the computer device to implement, as functions for exposure control performed on the basis of information of a region of interest detected from a captured image by a region-of-interest detection unit, functions of: performing exposure control in which a region-of-interest exposure target value calculated on the basis of a region-of-interest photometric value obtained from a first photometric region including at least a region of interest in an input frame is set as an exposure control value, in a case where the region of interest is detected from the captured image; performing exposure control in which a set region exposure target value calculated on the basis of a set region photometric value obtained from a second photometric region determined in advance in the input frame is set as the exposure control value, in a case where the region of interest is not detected from the captured image; and obtaining an exposure correction value on the basis of the region-of-interest exposure target value before a time of region-of-interest lost, and then performing exposure control with the exposure control value obtained by correcting the set region exposure target value with the exposure correction value, in a predetermined period in which the region of interest is not detected continuously from the time of the region-of-interest lost in which the region of interest is not detected from the captured image.

With such a program, the information processing apparatus according to the present technology described above is realized.

BRIEF DESCRIPTION OF DRAWINGS

FIG. 6 is an explanatory diagram of an effect of exposure control according to the embodiment.

FIG. 11 is an explanatory diagram illustrating another example of exposure control according to the second embodiment.

FIG. 17 is an explanatory diagram illustrating strength of a skin beautification effect.

MODE FOR CARRYING OUT THE INVENTION

Hereinafter, the embodiments will be described in the following order.
<1. First Embodiment>
(1-1. Configuration of Imaging Apparatus)
(1-2. AE control when Region of Interest is Lost)
(1-3. Processing Procedure)
<2. Second Embodiment>
<3. Moving Image Skin Beautification Effect Function>
<4. Modification Example>
<5. Program>
<6. Summary of Embodiments>
<7. Present Technology>

1. First Embodiment (1-1. Configuration of Imaging Apparatus)

Figure 1:
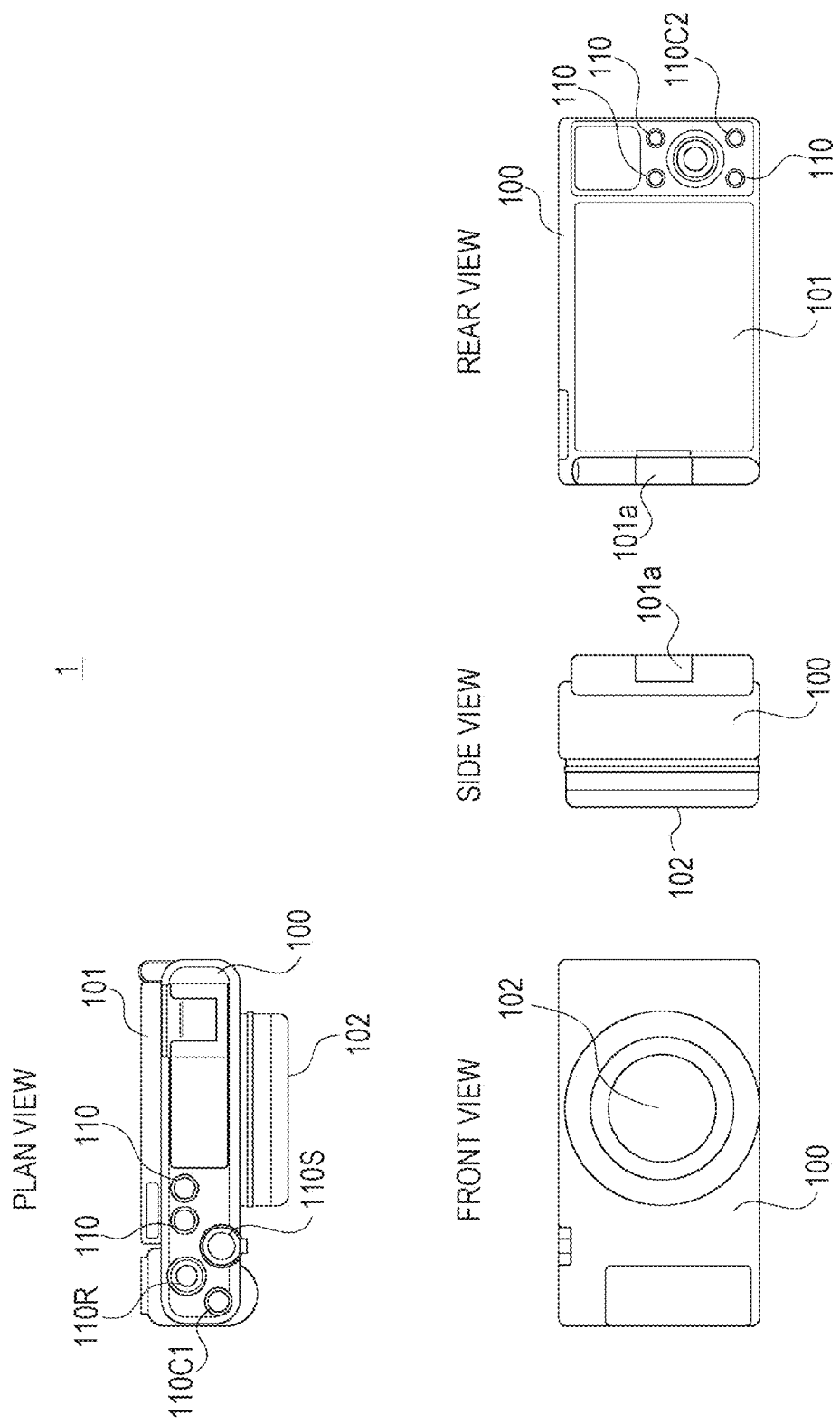
FIG. 1 is a plan view, a front view, a side view, and a rear view of an imaging control apparatus according to an embodiment of the present technology.

FIG. 1 is a plan view, a front view, a side view, and a rear view of an imaging apparatus 1 which is an imaging control apparatus according to an embodiment of the present technology.

The imaging apparatus 1 is a so-called digital camera, and can execute both still image capturing and moving image capturing.

In the imaging apparatus 1, a lens unit 102 is disposed on the front side of a body casing 100 constituting a camera body. At the time of imaging, a shutter on the front surface side is opened, and a lens for imaging is exposed.

On the rear surface side (user side) of the imaging apparatus 1, for example, a display panel 101 including a display device such as a liquid crystal display (LCD) or an organic electro-luminescence (EL) display is provided.

In this example, the display panel 101 is held by a shaft portion 101a so as to be openable/closable and rotatable, and is a so-called vari-angle display panel. In the drawing, the display panel 101 shows a state in which a display surface is not exposed.

A user can visually recognize an image at the time of imaging, an image at the time of reproduction, and various information by using the display panel 101.

Various operation elements 110 are provided on the body casing 100 of the imaging apparatus 1.

For example, as the operation elements 110, various operation elements such as a key, a dial, and a combined press/rotation operation element are provided to realize various operation functions. For example, a menu operation, a reproduction operation, a mode selection operation, a focus operation, a zoom operation, a selection operation for parameters such as a shutter speed and an F-number, or the like can be performed.

Although detailed description of each of the operation elements 110 is will be omitted, in the case of the present embodiment, several operators 110 including a shutter button 110S and a video recording button 110R are disposed on the upper surface side of the body casing 100.

In this case, the video recording button 110R is a relatively large button and is easy to operate. For example, the video recording button 110R has substantially the same size as that of the shutter button 110s.

For example, among the operation elements 110 provided on the upper surface side of the body casing 100, the shutter button 110S is the largest, and the video recording button 110R is the second largest. The opposite may be applied. Alternatively, the shutter button 110S and the video recording button 110R may have the same size.

In any case, since the video recording button 110R is a large-sized operation element on the upper surface side, for example, in a case where the moving image poster places the imaging apparatus 1 on the desk or the like and performs imaging, the operation becomes easy.

Custom buttons 110C1 and 110C2 are provided as the operation elements 110.

The custom buttons 110C1 and 110C2 are operation elements also called an assignable button, and is a button to which a predetermined operation function is assigned in an initial state and to which a user can assign an arbitrary operation function.

Note that the number of custom buttons is not limited to two, and may be one or three or more.

Figure 2:
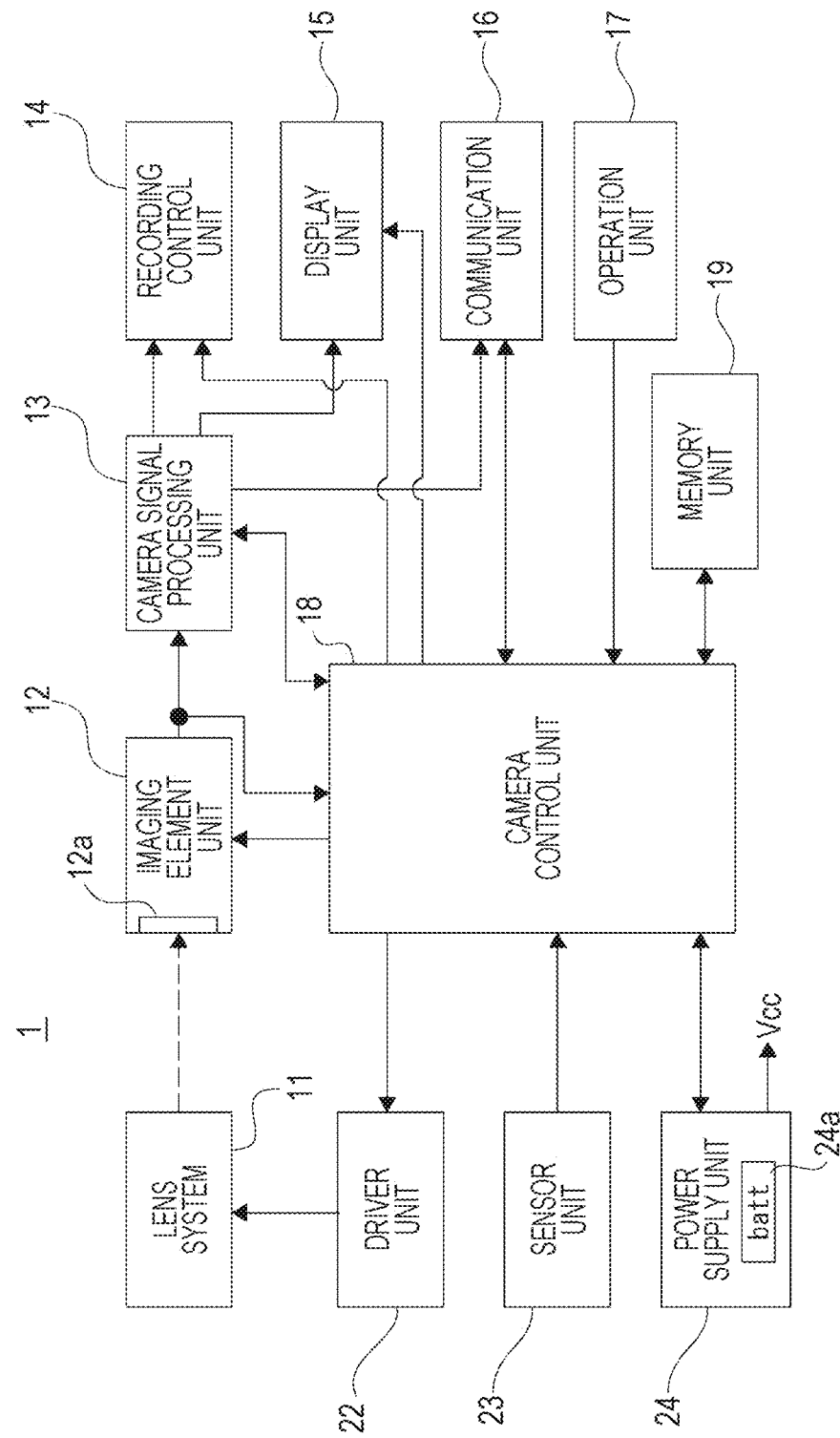
FIG. 2 is a block diagram of an internal configuration of an imaging control apparatus according to the embodiment.

The internal configuration example of the imaging apparatus 1 will be described with reference to FIG. 2.

The imaging apparatus 1 includes, for example, a lens system 11, an imaging element unit 12, a camera signal processing unit 13, a recording control unit 14, a display unit 15, a communication unit 16, an operation unit 17, a camera control unit 18, a memory unit 19, a driver unit 22, a sensor unit 23, and a power supply unit 24.

The lens system 11 includes lenses such as a zoom lens and a focus lens, a diaphragm mechanism, and the like. By the lens system 11, light (incident light) from a subject is guided and condensed on the imaging element unit 12.

The imaging element unit 12 is configured to, for example, have an image sensor 12*a* (imaging element) such as a complementary metal oxide semiconductor (CMOS) image sensor or a charge coupled device (CCD) image sensor.

The imaging element unit 12 performs, for example, correlated double sampling (CDS) processing, automatic gain control (AGC) processing, and the like, and further performs analog-to-digital (A/D) conversion processing on an electric signal obtained by photoelectrically converting light received by the image sensor 12*a*. Then, an imaging signal as digital data is output to the camera signal processing unit 13 and the camera control unit 18 in the subsequent stage.

The camera signal processing unit 13 is configured by, for example, a digital signal processor (DSP) or the like as an image processing processor. The camera signal processing unit 13 performs various signal processing on the digital signal (captured image signal) from the imaging element unit 12. For example, as camera processing, the camera signal processing unit 13 performs preprocessing, synchronization processing, YC generation processing, resolution conversion processing, file formation processing, and the like.

In the preprocessing, clamp processing of clamping the black level of RGB to a predetermined level, correction processing between the color channels of RGB, and the like are performed on the captured image signal from the imaging element unit 12.

In the synchronization processing, color separation processing is performed such that image data for each pixel has all RGB color components. For example, in the case of the imaging element using a color filter with a Bayer array, demosaic processing is performed as the color separation processing.

In the YC generation processing, a luminance (Y) signal and a color (C) signal are generated (separated) on the basis of the RGB image data.

In the resolution conversion processing, the resolution conversion processing is executed on the image data subjected to various signal processing.

In the file formation processing, for example, the image data subjected to the various processing described above is subjected to, for example, compression-encoding for recording or communication, formatting, generation or addition of metadata, and the like to generate a file for recording or communication.

For example, an image file in formats such as JPEG format, Tagged Image File Format (TIFF), or Graphics Interchange Format (GIF) is generated as a still image file. Furthermore, it is also conceivable to generate an image file in MP4 format or the like used for recording moving images and sound conforming to MPEG-4.

Note that it is also conceivable to generate an image file as raw image data.

The camera signal processing unit 13 generates metadata including information regarding a processing parameter in the camera signal processing unit 13, various control parameters acquired from the camera control unit 18, information indicating an operation state of the lens system 11 or an operation state of the imaging element unit 12, mode setting information, imaging environment information (date and time, place, and the like), identification information for the imaging apparatus itself, information regarding a mounting lens, information regarding a cameraman registered in advance (name and identification information), international press telecommunications council (IPTC) metadata, and the like.

Note that the IPTC metadata is metadata in format designed by a media company association, and can describe various information such as "description/caption", "description writer", "headline", "keyword", and the like.

The recording control unit 14 performs, for example, recording and reproduction with respect to a recording medium such as a nonvolatile memory. For example, the recording control unit 14 performs processing of recording an image such as moving image data or still image data or metadata on a recording medium.

Various actual forms of the recording control unit 14 can be considered. For example, the recording control unit 14 may be configured as a flash memory and a write/read circuit thereof built in the imaging apparatus 1. Furthermore, the recording control unit 14 may be in the form of a card recording/reproduction unit that performs recording and reproduction access for a recording medium that can be attached to and detached from the imaging apparatus 1, such as a memory card (a portable flash memory, or the like). Furthermore, the recording control unit 14 may be realized as a hard disk drive (HDD) or the like as a form built in the imaging apparatus 1.

The display unit 15 is a display unit that performs various displays to an imaging person, and is, for example, a display panel or viewfinder including a display device such as a liquid crystal panel (liquid crystal display (LCD)) or an organic electro-luminescence (EL) display, which is disposed in the casing of the imaging apparatus 1.

The display unit 15 performs various displays on a display screen on the basis of an instruction of the camera control unit 18.

For example, the display unit 15 displays a reproduction image of the image data read from the recording medium by the recording control unit 14.

Furthermore, the image data of a captured image of which resolution has been converted for display by the camera signal processing unit 13 may be supplied to the display unit 15, and the display unit 15 may perform a display on the basis of the image data of the captured image in response to an instruction from the camera control unit 18. Accordingly, a so-called through image (monitoring image of a subject), which is a captured image that is being subjected to composition confirmation, moving image recording, or the like is displayed.

Furthermore, the display unit 15 performs a display of various operation menus, icons, messages, and the like, that is, a graphical user interface (GUI) on the screen on the basis of the instruction of the camera control unit 18

The communication unit 16 comprehensively indicates various communication devices and various communication processing circuits mounted on the imaging apparatus 1.

Various communication circuits and various communication devices are provided which can perform communication via an external communication network (external network communication), local communication with a mobile terminal 9, and further master/slave communication with corresponding apparatus, for example, with another imaging apparatus 1 as an aspect of the local communication, as communication by the communication unit 16.

According to this, for example, the imaging apparatus 1 performs transmission and reception of captured image data (still image file or moving image file), metadata, various parameters, and the like with respect to an external information processing apparatus, imaging apparatus, display apparatus, recording apparatus, reproduction apparatus, and the like.

More specifically, the communication unit 16 as a network communication unit includes some or all of, for example, a function of performing communication by using a mobile communication network such as 4G, 5G, or the like, an Internet line, a home network, a local area network (LAN), and the like, a function of performing short-range wireless communication such as Bluetooth (registered trademark) communication, Wi-Fi (registered trademark) communication, or near field communication (NFC), a function of performing infrared communication or the like, a function of performing wired connection communication with another apparatus, and the like.

The operation unit 17 collectively indicates input devices for the user to perform various input operations. Specifically, the operation unit 17 indicates various operation elements (Key, dial, touch panel, touch pad, and the like) provided in the casing of the imaging apparatus 1.

The operation of the user is detected by the operation unit 17, and a signal corresponding to the input operation is transmitted to the camera control unit 18.

The camera control unit 18 includes a microcomputer (arithmetic processing device) including a central processing unit (CPU).

The memory unit 19 stores information or the like used for processing by the camera control unit 18. As the illustrated memory unit 19, for example, a read only memory (ROM), a random access memory (RAM), a flash memory, and the like are comprehensively indicated.

The memory unit 19 may be a memory region built in a microcomputer chip as the camera control unit 18 or may be configured by a separate memory chip.

The camera control unit 18 controls the entire imaging apparatus 1 by executing a program stored in the ROM, the flash memory, or the like of the memory unit 19.

For example, the camera control unit 18 controls operations of necessary units, such as control of the shutter speed of the imaging element unit 12, an instruction of various signal processing in the camera signal processing unit 13, an imaging operation and recording operation according to a user's operation, a reproduction operation of a recorded image file, an operation of the lens system 11, such as zooming, focusing, and diaphragm adjustment in a lens barrel, a user interface operation, and setting of a communication scheme and transmission destination by the communication unit 16.

Furthermore, in particular, in the present embodiment, the camera control unit 18 performs, for the captured image, exposure control based on a photometric value. Note that details of the exposure control according to the embodiment will be described later again.

Furthermore, the camera control unit 18 in the present example performs processing of detecting a region of interest from the captured image, and the region of interest and the detection processing will also be described later.

The RAM in the memory unit 19 is used for temporary storage of data, programs, and the like as a work area at the time of various data processing of the CPU of the camera control unit 18.

The ROM and the flash memory (nonvolatile memory) in the memory unit 19 are used for storing an operating system (OS) for the CPU to control each unit, content files such as image files, application programs for various operations, firmware, various setting information, and the like.

Examples of the various setting information include communication setting information, setting information regarding imaging operations such as exposure setting (shutter speed or F-number) and mode setting, setting information regarding image processing such as white balance setting, color setting, and setting for an image effect, setting information regarding operability such as custom key setting and display setting, and the like.

The driver unit 22 is provided with, for example, a motor driver for a zoom lens drive motor, a motor driver for a focus lens drive motor, a motor driver for a motor of a diaphragm mechanism, and the like.

These motor drivers apply a drive current to a corresponding driver in response to an instruction from the camera control unit 18, and cause the driver to execute movement of the focus lens or the zoom lens, opening and closing of the diaphragm blade of the diaphragm mechanism, and the like.

The sensor unit 23 comprehensively indicates various sensors mounted on the imaging apparatus.

For example, an inertial measurement unit (IMU) is mounted as the sensor unit 23. For example, an angular velocity (gyro) sensor having three axes of pitch, yaw, and roll can detect an angular velocity, and an acceleration sensor can detect an acceleration.

Furthermore, as the sensor unit 23, for example, a position information sensor, an illuminance sensor, or the like may be mounted.

Furthermore, it is assumed that a distance measuring sensor is provided as the sensor unit 23. The distance from the imaging apparatus 1 to the subject can be measured by the distance measuring sensor at the time of imaging, and the distance information can be added, as metadata, to the captured image.

Various information detected by the sensor unit 23, for example, position information, distance information, illuminance information, IMU data, and the like are added as metadata to the captured image together with date and time information managed by the camera control unit 18.

The power supply unit 24 outputs a power supply voltage Vcc necessary for each unit by using a battery 24a as a power supply. ON/OFF of supply of the power supply voltage Vcc from the power supply unit 24, that is, ON/OFF of the power supply of the imaging apparatus 1 is controlled by the camera control unit 18. Furthermore, the camera control unit 18 can detect the capacity of the battery 24a, that is, the remaining battery capacity.

Note that the power supply unit 24 may be configured to be capable of outputting the power supply voltage Vcc on the basis of an external power supply, for example, by connecting an AC adapter or receiving supply of a DC power supply voltage.

(1-2. AE Control when Region of Interest is Lost)

Figure 3:
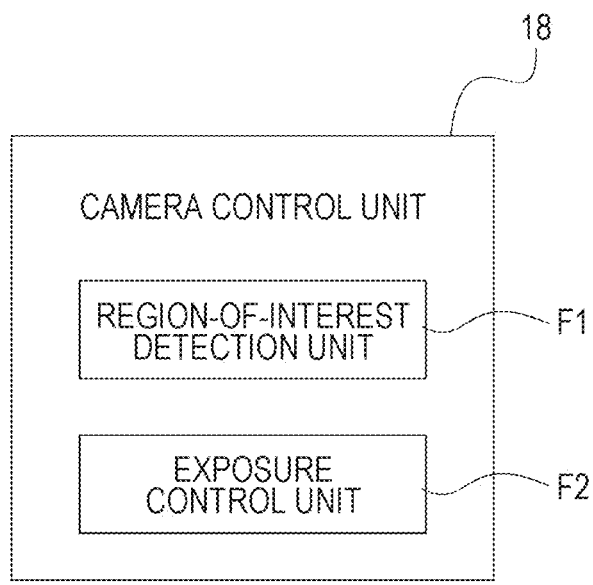
FIG. 3 is a functional block diagram illustrating a functional configuration of exposure control according to the embodiment.

FIG. 3 is a functional block diagram illustrating a functional configuration of exposure control according to the embodiment included in the camera control unit 18.

As illustrated in the drawing, the camera control unit 18 includes a region-of-interest detection unit F1 and an exposure control unit F2 as functional configurations related to exposure control as the embodiment.

The region-of-interest detection unit F1 detects the region of interest from the image captured by the imaging element unit 12.

The region of interest mentioned here means a region in which an object defined in advance as a target to be paid attention exists in the captured image. Examples of the object as a target in the region of interest include an independent object such as a person, an animal, a plant, a car, a train, an airplane, furniture, and a traffic light, and a specific portion in the independent object, for example, a face or hand of a person, a license plate of a car, and the like.

As a method of detecting the region of interest, various methods can be considered. As an example, a method of detecting a region of interest by template matching using a template image of a target object can be exemplified. Alternatively, for example, it is also possible to detect the region of interest from the captured image by using an image recognition artificial intelligence (AI) engine through a convolutional neural network (CNN) or the like.

Hereinafter, as an example, it is assumed that the region-of-interest detection unit F1 detects a region of a face of a person as a region of interest. Hereinafter, the region of interest as the region of the face of a person is referred to as a "face region Af".

The exposure control unit F2 performs exposure control on the basis of the information of the region of interest detected from the captured image by the region-of-interest detection unit F1.

Specifically, in a case where the face region Af is detected from the captured image, the exposure control unit F2 in the present example calculates a "face exposure target value" that is an exposure target value of the face region Af on the basis of a photometric value obtained from a first photometric region including at least the face region Af in the input frame, and performs exposure control using the face exposure target value as an exposure control value.

Here, the first photometric region is assumed to be the same region as the face region Af in the present example. Note that the first photometric region may include a region other than the face region Af, such as a background region of the face region Af in the input frame, and is only required to be a region including the face region Af at least in the input frame. For example, the face exposure target value can be obtained on the basis of a photometric value obtained from the face region Af and a photometric value obtained from the entire frame (the entire composition). Accordingly, it is possible to prevent the entire composition from becoming too bright (or dark).

Hereinafter, in a case where the face region Af is detected as described above, a function of performing exposure control using the face exposure target value as the exposure control value will be referred to as a "face AE function".

Note that the value of "exposure" indicated in the present specification, such as the exposure target value and the exposure control value, which are described above, is a value indicating at least a combination of the shutter speed and a diaphragm value (F-number).

Note that in a case where the face region Af is not detected from the captured image, the exposure control unit F2 calculates a "set region exposure target value" on the basis of a set region photometric value obtained from a second photometric region determined in advance in the input frame, and performs exposure control using the set region exposure target value as an exposure control value.

Here, the second photometric region described above is determined by a photometric mode. Examples of the photometric mode include a multi-photometric mode in which photometry is performed by dividing the inside of the frame into multiple parts, and exposure is controlled by balancing the whole frame, a center-weighted photometric mode in which photometry is performed with emphasis on a central portion of the frame, and exposure is determined on the basis of brightness near the central portion, and a spot photometric mode in which exposure control is performed on the basis of a photometric value of a partial region designated inside the frame.

The second photometric region is the entire region of the frame when the photometric mode is the multi-photometric mode or the center-weighted photometric mode, and is the designated partial region described above in a case where the photometric mode is the spot photometric mode.

In the following description, it is assumed that the photometric mode is either the multi-photometric mode or the center-weighted photometric mode, and the "second photometric region" is the entire region of the frame.

Here, in the general face AE function, for example, in a case where a person as a subject faces sideways or the like and the face cannot be detected, the exposure control is switched to exposure control for the entire composition as the exposure control. That is, the exposure control is switched to exposure control in which the "entire exposure target value", which is the exposure target value for the entire composition, is set as the exposure control value. Therefore, in a case where the face cannot be detected, there is a problem that the face becomes dark.

As a measure against such a problem, it is conceivable to fix brightness at the time of face detection for a certain period even when the face cannot be detected. As a method of fixing the brightness, there is also a method of performing AE-lock. However, in a case where the brightness of the entire composition greatly changes, there is a possibility that the brightness cannot follow, and thus overexposure or underexposure occurs (See FIGS. 4A and 4B).

In the present embodiment, a method of fixing to the face exposure target value at the time of face detection is not adopted, and an exposure control method of calculating an exposure correction value based on the face exposure target value (hereinafter, referred to as "face exposure correction value") and maintaining (keeping) the face exposure correction value for a predetermined period is adopted.

Specifically, in a predetermined period in which the face region Af is not detected continuously from the time of a face region lost in which the face region Af is not detected from the captured image, the exposure control unit F2 obtains the face exposure correction value on the basis of the face exposure target value before the time of the face region lost, and performs the exposure control with the exposure control value obtained by correcting the entire exposure target value with face exposure correction value.

In the present example, the exposure control unit F2 obtains, as the face exposure correction value described above, a value indicating a relationship between the entire exposure target value before the time of the face region lost and the face exposure target value before the time of the face region lost. Specifically, the exposure control unit F2 obtains, as the face exposure correction value, a difference value between the entire exposure target value before the time of the face region lost and the face exposure target value before the time of the face region lost.

Here, as the face exposure target value before the time of the face region lost and the entire exposure target value before the time of the face region lost, it is conceivable to use the face exposure target value and the entire exposure target value, which are calculated in the frame immediately before the frame in which the face region Af is lost, respectively. Alternatively, it is also conceivable to use an average value of exposure target values from the immediately preceding frame to a frame a predetermined number of frames before.

The face exposure target value before the time of the face region lost and the entire exposure target value before the time of the face region lost is only required to be based on the face exposure target value and the entire exposure target value, which are obtained in the frame immediately before the frame in which the face region Af is lost or the frame in the vicinity of the immediately preceding frame (frame in the vicinity of the past side).

Hereinafter, the face exposure target value before the time of the face region lost and the entire exposure target value before the time of the face region lost is assumed to be the face exposure target value and the entire exposure target value, which are calculated in the frame immediately before the frame in which the face region Af is lost, respectively.

In the present example, the face exposure correction value is obtained as ["face exposure target value before time of face region lost"-"entire exposure target value before time of face region lost"].

In this case, in a predetermined period from the timing when the face region Af is lost, correction of adding the face exposure correction value to the entire exposure target value is performed, and exposure control is performed with the exposure control value obtained by the correction.

Figure 5:
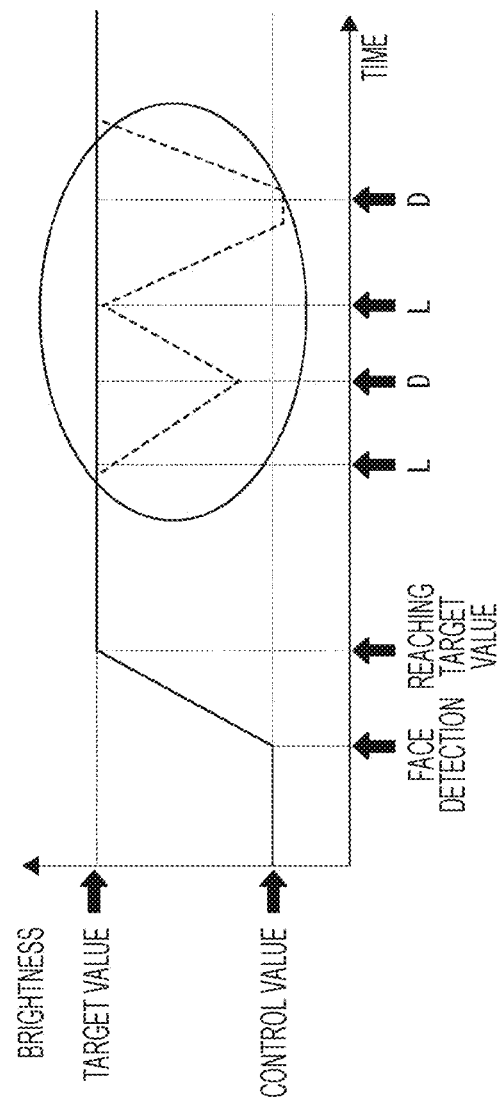
FIG. 5 is an explanatory diagram of an effect of exposure control according to the embodiment.

FIGS. 5 and 6 are explanatory diagrams illustrating an effect of the exposure control according to the embodiment as described above.

By performing the exposure control as described above, when there is no change in the brightness of the background of the face region Af, as illustrated in FIG. 5, even when detection ("D" in FIG. 5) and non-detection ("L" in FIG. 5) are repeated in face detection, the correction using the face exposure correction value is kept, and thus the brightness of the face (when facing sideways or backward, the brightness of a head) can be kept at appropriate brightness.

Furthermore, by adopting a method of correcting the entire exposure target value with the face exposure correction value (value indicating a relationship between the entire exposure target value before the time of the face region lost and the face exposure target value before the time of the face region lost) in a predetermined period after the face region lost, as illustrated in FIGS. 6A and 6B, even when the brightness of the entire composition changes after the face is lost, it is possible to follow the change in brightness. Specifically, as illustrated in FIG. 6A, even when the entire composition becomes bright after the face is lost and the brightness changes in a direction in which the entire exposure target value decreases, the change can be followed. Furthermore, as illustrated in FIG. 6B, even when the entire composition becomes dark after the face is lost and the brightness changes in a direction in which the entire exposure target value increases, the change can be followed.

After a predetermined period is kept from the time of the face lost, exposure control is performed such that the brightness of the entire composition becomes appropriate by releasing the exposure correction using the face exposure correction value.

Figure 4:
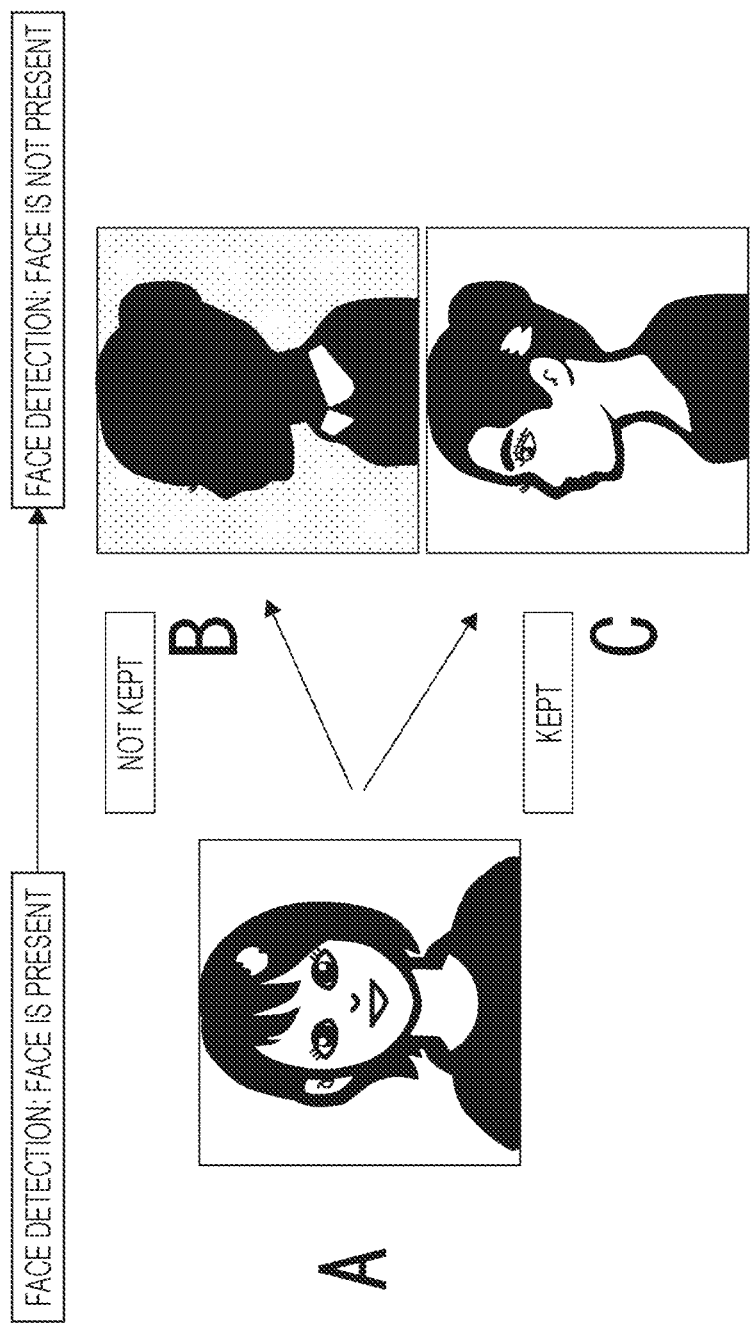
FIG. 4 is a diagram schematically illustrating an effect of exposure control by an appearance of a captured image according to the embodiment.

Note that, in FIG. 4 described above, by the transition from FIG. 4A to FIG. 4C, the action of the exposure control as the present embodiment is schematically illustrated by the appearance of the captured image.

As described above, according to the exposure control of the present embodiment, in a case where the face is lost, it is possible to implement appropriate exposure control in consideration of both the brightness of the face and the brightness of the entire composition, and to improve the function of the exposure control.

(1-3. Processing Procedure)

Figure 7:
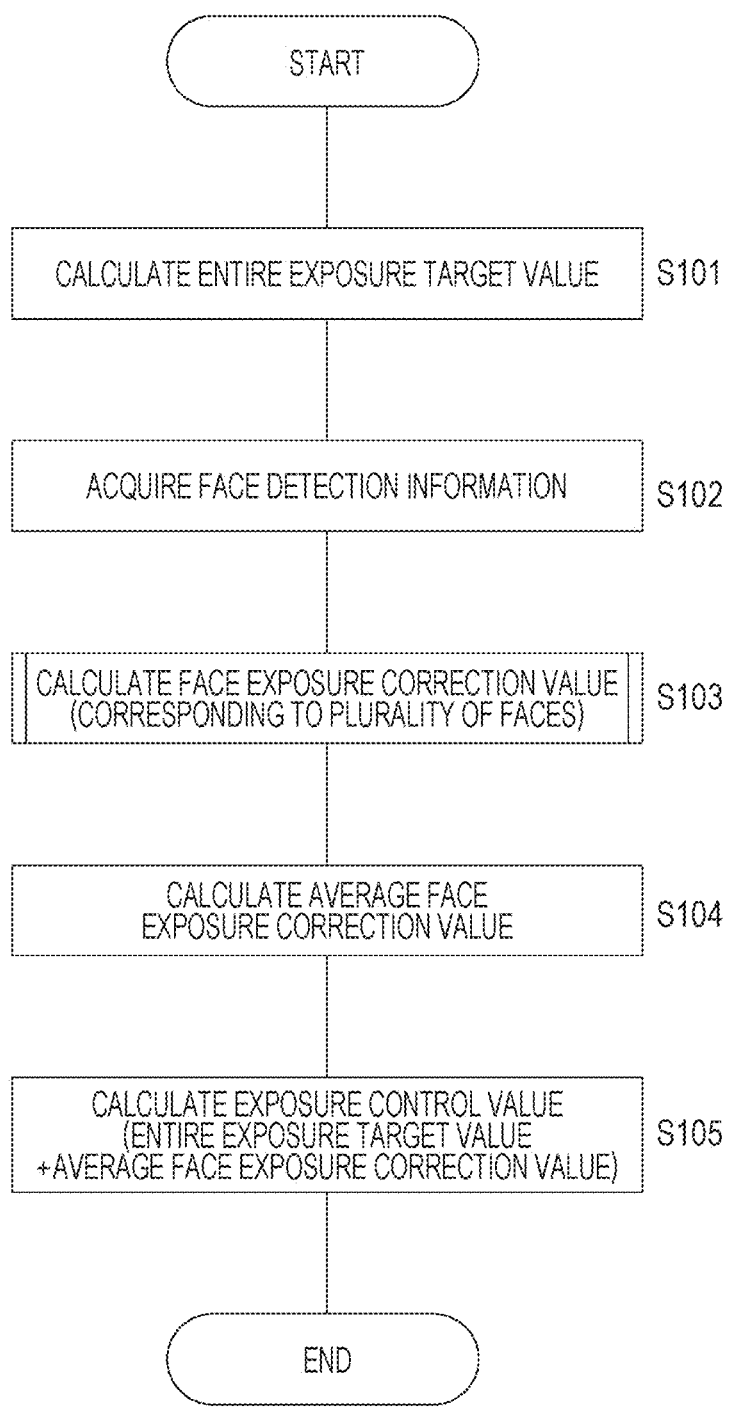
FIG. 7 is a flowchart illustrating an example of a specific processing procedure for implementing exposure control according to a first embodiment.
Figure 8:
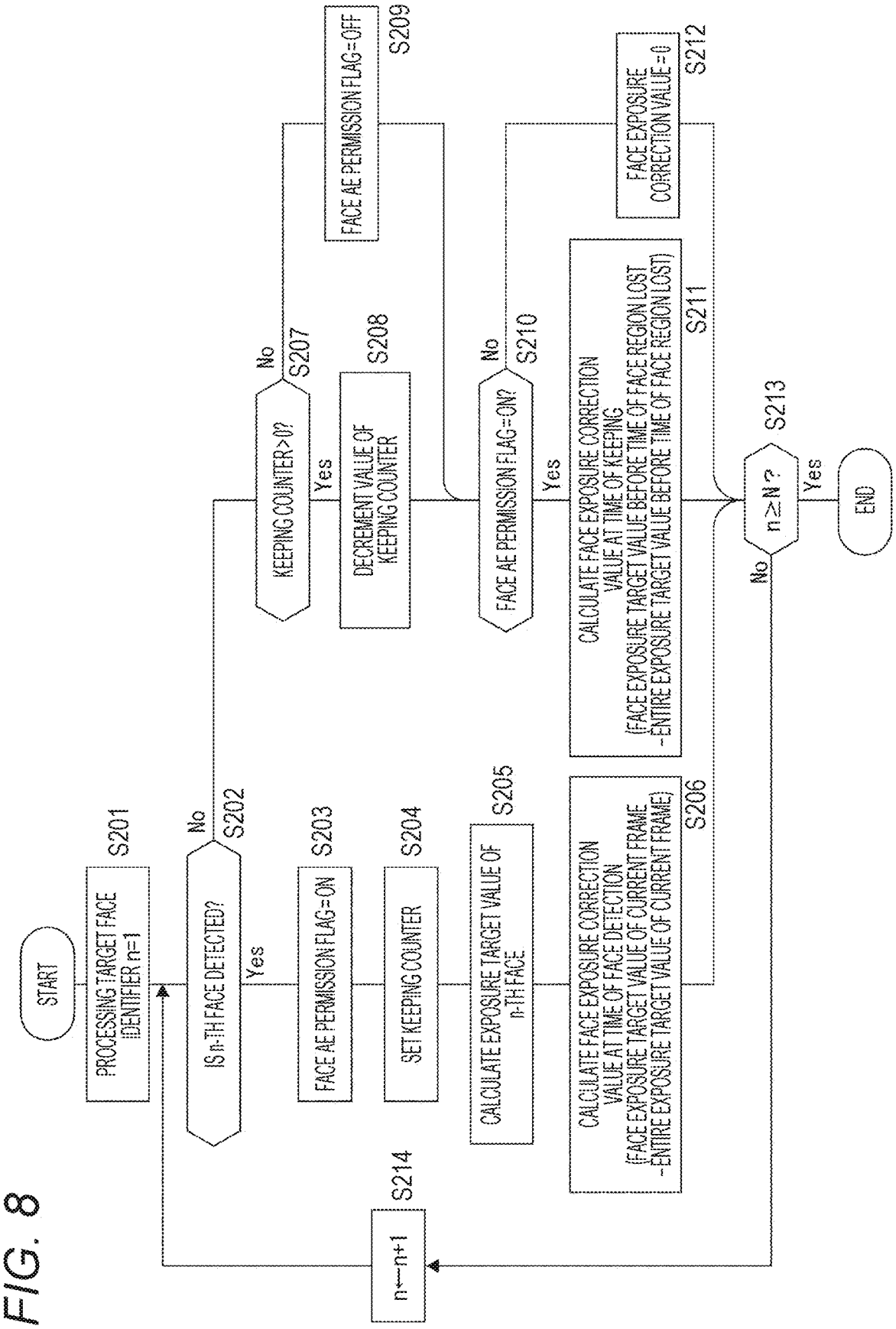
FIG. 8 is a flowchart of processing of calculating a face exposure correction value illustrated in FIG. 7.

FIGS. 7 and 8 are flowcharts illustrating an example of a specific processing procedure for implementing exposure control according to the first embodiment described above.

Note that the processing illustrated in FIGS. 7 and 8 are executed by the camera control unit 18 in the present example. The camera control unit 18 repeatedly executes a series of processing illustrated in FIG. 7 for each frame of the captured image obtained by the imaging element unit 12.

In FIG. 7, the camera control unit 18 calculates the entire exposure target value in step 3101. That is, the entire exposure target value is calculated on the basis of the photometric value of the second photometric region described above in the input frame (in the present example, the entire region of the input frame).

In step S102 subsequent to step S101, the camera control unit 18 performs processing of acquiring face detection information. That is, processing of acquiring information of the face region Af (at least information regarding a position and a range (size) in the input frame) detected with the function of the region-of-interest detection unit F1 is performed.

In step S103 subsequent to step S102, the camera control unit 18 performs processing of calculating the face exposure correction value. In the present example, the processing of calculating the face exposure correction value is processing that can also cope with a case where a plurality of the face regions Af is detected.

FIG. 8 is a flowchart of processing of calculating the face exposure correction value executed in step S103.

As illustrated in the drawing, in the processing of calculating the face exposure correction value, the camera control unit 18 first sets a processing target face identifier n to "one" in step S201. The processing target face identifier n is a value for identifying a face region Af to be processed in the processing of calculating the face exposure correction value.

Here, although not illustrated, every time the face region Af is newly detected, the camera control unit 18 manages the newly detected face region Af with the processing target face identifier n. Specifically, the management is performed by adding a new processing target face identifier n.

In step S202 subsequent to step S201, the camera control unit 18 determines whether or not the n-th face (face region Af) is detected. In step S202, when the n-th face region Af is detected, the camera control unit 18 causes the processing to proceed to step S203, sets a face AE permission flag to ON, and performs processing of setting a keeping counter in subsequent step S204.

The face AE permission flag is a state management flag for the detected face region Af. Specifically, the face AE permission flag is a flag for identifying whether or not a target face region Af is in a state until the predetermined period (keeping period) illustrated in FIG. 6 elapses after the detection.

The processing of setting the keeping counter in step S204 is processing of setting a counter for setting a predetermined period as the keeping period. A value of the keeping counter is decremented for each frame by processing in step S208 to be described later, and the determination for elapse of the keeping period is performed when it is determined whether or not the value of the keeping counter reaches "zero" in step S207. In a case where the keeping period has elapsed, the face AE permission flag is set to OFF in step S209 to be described later.

In present example, the camera control unit 18 sets a predetermined fixed value as the value of the keeping counter. In this case, the keeping period is a fixed period.

In step S205 subsequent to step S204, the camera control unit 18 calculates the exposure target value of the n-th face (face exposure target value). Then, in subsequent step S206, the camera control unit 18 calculates the face exposure correction value at the time of face detection. Specifically, in the present example, ["face exposure target value of current frame"–"entire exposure target value of current frame"] is calculated as the face exposure correction value at the time of the face detection. As described for confirmation, the "face exposure target value of the current frame" is the exposure target value calculated in step S205, and the "entire exposure target value of the current frame" is the exposure target value calculated in step S101 of FIG. 7.

As described above, for the face region Af being detected, the face exposure correction value at the time of the face detection is calculated on the basis of the "face exposure target value of the current frame" and the "entire exposure target value of the current frame". As will be described later, in a case where a plurality of the face regions Af is detected, the face exposure correction values at the time of the face detection, which are calculated for a plurality of the face regions Af, are averaged and used to correct the entire exposure target value (See steps S104 and S105 in FIG. 7).

When the calculation processing in step S206 is executed, the camera control unit 18 causes the processing to proceed to step S213 and determines whether or not the processing target face identifier n is equal to or greater than the maximum value N. Here, the maximum value N is the total number of face regions Af to which the processing target face identifier n is added.

In step S213, when the processing target face identifier n is not equal to or greater than the maximum value N, the camera control unit 18 causes the processing to proceed to step S214, increments the processing target face identifier n by one, and returns to step S202.

In a case where it is determined in step S202 that the n-th face is not detected, the camera control unit 18 causes the processing to proceed to step S207 and determines whether or not the keeping counter>zero, that is, whether or not the value of the keeping counter is greater than zero. When the keeping counter>zero, the camera control unit 18 causes the processing to proceed to step S208, decrements the value of the keeping counter (for example, decrements by one), and causes the processing to proceed to step S210. In this case, the face AE permission flag of the n-th face region Af remains in the ON state.

On the other hand, when the value of the keeping counter is not greater than zero, the camera control unit 18 causes the processing to proceed to step S209, sets the face AE permission flag to OFF, and causes the processing to proceed to step S210.

In step S210, the camera control unit 18 determines whether or not the face AE permission flag is in the ON state. This corresponds to determining whether or not it is before the elapse of the keeping period after the face region lost for the n-th face region Af.

In step S210, when the face AE permission flag is in the ON state, the camera control unit 18 causes the processing to proceed to step S211 and calculates the face exposure correction value at the time of keeping. Specifically, in the present example, ["face exposure target value before time of face region lost"–"entire exposure target value before time of face region lost"] is calculated as the face exposure correction value at the time of keeping. For confirmation, the "time of the face region lost" mentioned here means the time at which the n-th face region Af is lost.

When the calculation processing in step S211 is executed, the camera control unit 18 causes the processing to proceed to step S213 described above.

On the other hand, in a case where it is determined in step S210 that the face AE permission flag is not in the ON state, the camera control unit 18 causes the processing to proceed to step S212, sets "zero" as the face exposure correction value, and causes the processing to proceed to step S213. As described above, for the face region Af in which the face AE permission flag is set to OFF, that is, the face region Af in which the keeping period has elapsed, the face exposure target value of the face region Af is not used to correct the entire exposure target value of the current frame.

When it is determining that the processing target face identifier n is equal to or greater than the maximum value N in step S213, the camera control unit 18 ends the series of processing illustrated in FIG. 8.

Through the series of processing in FIG. 8 as described above, for the face region Af being detected, the face exposure correction value at the time of face detection is calculated on the basis of the "face exposure target value of the current frame" and the "entire exposure target value of the current frame" (S206), and for the face region Af within a predetermined period after the face region is lost, the face exposure correction value at the time of keeping is calculated on the basis of the "face exposure target value before the time of the face region lost" and the "entire exposure target value before the time of the face region lost" (S211).

The description returns to FIG. 7.

In FIG. 7, the camera control unit 18 calculates an average face exposure correction value in step S104 when the calculation processing of the face exposure correction value is executed in step S103. That is, the average value of the face exposure correction values (including the detection time and the keeping time) calculated in step S103 is calculated. Note that in a case where there is only one face region Af managed with the processing target face identifier n, the face exposure correction value calculated for the face region Af is set as an average face exposure correction value in step S104.

Then, in step S105 subsequent to step 3104, the camera control unit 18 performs processing of calculating an exposure control value by ["entire exposure target value"+"average face exposure correction value"] as processing of calculating the exposure control value.

The camera control unit 18 ends the series of processing illustrated in FIG. 7 when the processing in step 105 is executed.

When all the face regions Af are detected through the series of processing described above, the entire exposure target value of the current frame is corrected with the average value of the face exposure correction values at the time of detection, which is obtained for all the face regions Af, and the exposure control is performed using the corrected entire exposure target value as the exposure control value.

Furthermore, when all the face regions Af exist within the keeping period after the face region is lost, the entire exposure target value of the current frame is corrected with the average value of the face exposure correction values at the time of keeping, which is obtained for all the face regions Af, and the exposure control is performed using the corrected entire exposure target value as the exposure control value.

Moreover, in a case where the face region Af in the detected state and the face region Af within the keeping period after the face region is lost are mixed, the face exposure correction value at the time of detection is calculated for the face region Af in the detected state, and the face exposure correction value at the time of keeping is calculated for the face region Af within the keeping period after the face region is lost. The entire exposure target value of the current frame is corrected with the average value of the face exposure correction value at the time of detection and the face exposure correction value at the time of keeping, and the exposure control is performed with the corrected entire exposure target value as the exposure control value.

Note that even in a case where the face region Af in the detected state is mixed as described above, for the face region Af within the keeping period after the face region is lost, the entire exposure target value is always corrected on the basis of the face exposure correction value at the time of keeping, that is, the face exposure correction value calculated on the basis of the "face exposure target value before the time of the face region lost" and the "entire exposure target value before the time of the face region lost".

2. Second Embodiment

Next, the second embodiment will be described. In the second embodiment, in a case where a plurality of the face regions Af is detected, the face exposure target value used to calculate the face exposure correction value is calculated on the basis of at least one of the size, number, or position of the detected face region Af.

Note that, in the second embodiment, since the hardware configuration of the imaging apparatus 1 is similar to that of the first embodiment, overlapping description will be avoided.

Furthermore, in the following description, the same reference numerals are given to portions similar to those already described, and the description thereof will be omitted.

FIG. 9A illustrates a composition in which relatively large face region Af located in the central portion of the frame of the captured image is located in the sun, and relatively small face region Af located near a frame end is located in the shade. In general, in a case where a plurality of subjects of the same type such as a "person" is captured in a frame, when there is a relatively large subject at the central portion of the frame as in the example of FIG. 9A and there is a relatively small subject near the frame end, it can be said that the subject at the central portion of the frame is the main subject in terms of composition.

In the composition of the case of FIG. 9A, when the face exposure target value of the face region Af near the frame end is used to calculate the face exposure correction value, a small face near the frame end is dark, and thus there is a possibility that the face exposure correction value become great, which leads to overexposure.

Therefore, for the captured image, in the region of the image, a region in which the main subject is estimated to be captured is defined as a specific region As, and for the face region Af outside the specific region As, the face exposure target value is not used to calculate the face exposure correction value (see FIG. 9B). Therefore, the exposure correction value can be calculated using only the exposure target value of the face region Af detected in the specific region As, that is, the subject region considered as compositionally main subject region, and appropriate exposure control can be implemented.

In the present example, the specific region As is defined as a rectangular partial region including an image center in the region of the captured image. More specifically, the specific region As is set to have a size in which the center of the specific region As coincides with the image center and an area ratio with respect to the entire captured image is at least equal to or greater than one half.

Note that the position and size of the specific region As are not limited thereto. The specific region As is only required to be determined at a position or a size at which the main subject is estimated to be captured in a compositional manner, and can be set at a position offset from the center of the captured image in at least one of upper, lower, right, and left directions. Furthermore, the area ratio of the size with respect to the entire captured image may be equal to or less than one half. Moreover, the specific region As is not limited to a region of which the position and size are fixed, and for example, the position and size of the region can be made variable according to a user's operation, a result of image analysis, or the like.

Figure 10:
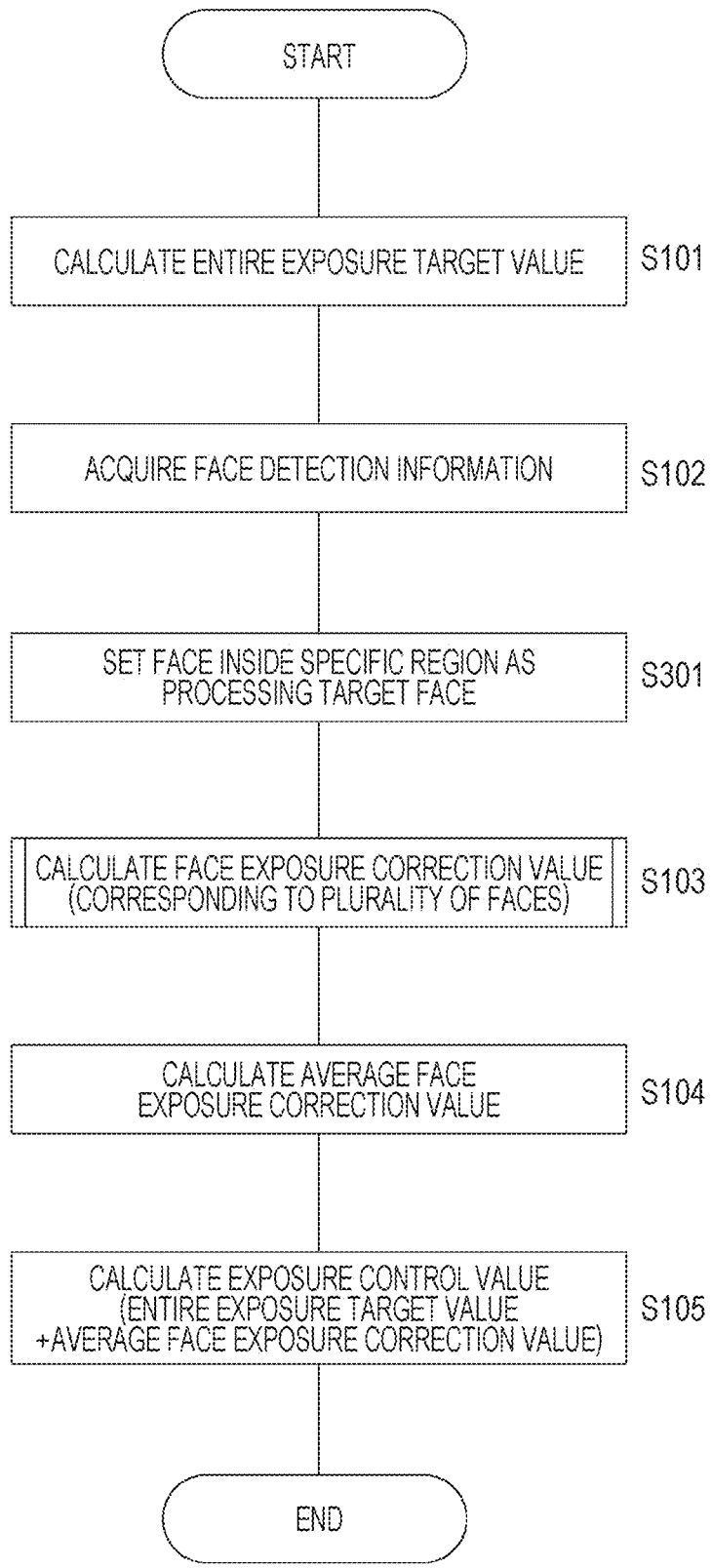
FIG. 10 is a flowchart illustrating an example of a specific processing procedure for implementing exposure control according to the second embodiment.

FIG. 10 is a flowchart illustrating an example of a specific processing procedure for implementing exposure control according to the second embodiment described above.

Note that processing illustrated in FIG. 10 is repeatedly executed by the camera control unit 18 for each frame of the captured image in a similar manner to the processing previously illustrated in FIG. 7.

First, the camera control unit 18 executes the processing of step S102 subsequent to the processing of step S101. These processing are similar to those described in FIG. 7, and thus overlapping description will be avoided.

In this case, the camera control unit 18 executes the processing of step S301 when the face detection information is acquired in step S102. In step S301, the camera control unit 18 performs processing of setting the face in the specific region As as the face to be processed. That is, only the face region Af located in the specific region As among the face regions Af detected in the captured image is set as the face region Af to be a target of processing of calculating the face exposure correction value in step S103.

In this case, the camera control unit 18 causes the processing to proceed to step S103 when the setting processing in step S301 is executed. The processing from step S103 to step S105 are similar to those described in FIG. 7, and thus overlapping description will be avoided.

With the processing as described above, for the face region Af detected outside the specific region As, the face exposure target value can be prevented from being used to calculate the face exposure correction value in both the keeping period before the face region lost and the keeping period after the face region lost. According to this, it is possible to prevent the brightness of the main subject from becoming inappropriate due to the brightness of a non-main subject detected outside the specific region As, and it is possible to implement appropriate exposure control.

Here, in the above description, for the face region Af detected outside the specific region As, the face exposure target value of the face region Af is not unconditionally used to calculate the face exposure correction value. However, as illustrated in FIG. 11, it is also possible to determine whether or not the face exposure target value is used to calculate the face exposure correction value on the basis of the size, number, and position of the face region Af detected outside the specific region As.

Specifically, as illustrated in FIG. 11A, in a case where the size of the face region Af detected outside the specific region As is greater than the size of the face region Af detected in the specific region As, the face exposure target value of the face region Af detected outside the specific region As is used to calculate the face exposure correction value.

In this case, in the processing of step S301 illustrated in FIG. 10, the camera control unit 18 determines the magnitude relationship between the size of the face region Af detected outside the specific region As and the face region Af detected inside the specific region As, and determines whether or not the face region Af detected outside the specific region As is to be processed on the basis of the result of determination of the magnitude relationship. That is, when the size of the face region Af detected outside the specific region As is greater, the face region Af is set as the processing target, and when the size of the face region Af detected outside the specific region As is not greater, the face region Af is not set as the processing target.

Note that, in the above description, the example has been described in which the size of the face region Af detected inside the specific region As is compared with the size of the face region Af detected outside the specific region As. However, the size of the face region Af outside the specific region As may be compared with at least a certain reference size (reference size). For example, the reference size may be a certain fixed size or may be a size that is variable according to some conditions.

Furthermore, as illustrated in FIG. 11B, in a case where the number of the face regions Af detected outside the specific region As is equal to or greater than a certain number, the face exposure target values of the face regions Af detected outside the specific region As can be used to calculate the face exposure correction value.

In this case, in the processing of step S301 illustrated in FIG. 10, the camera control unit 18 determines whether or not the number of the face regions Af detected outside the specific region As is equal to or greater than a predetermined threshold, sets the face region Af detected outside the specific region As as a processing target when the number of the face regions Af is equal to or greater than the threshold, and does not set the face region Af detected outside the specific region As as a processing target when the number of the face regions Af is not equal to or greater than the threshold.

Furthermore, as illustrated in FIG. 11 C, in a case where a distance between the face region Af detected outside the specific region As and the face region Af detected inside the specific region As is within a certain distance, the face exposure target value of the face region Af detected outside the specific region As is used to calculate the face exposure correction value.

In this case, in the processing of step S301 illustrated in FIG. 10, the camera control unit 18 calculates a distance between the face region Af detected outside the specific region As and the face region Af detected inside the specific region As, sets the face region Af detected outside the specific region As as a processing target when the distance is within a certain distance, and does not set the face region Af detected outside the specific region As as the processing target when the distance is not within a certain distance.

Note that the processing illustrated in FIGS. 11A to 11C can be combined. For example, regarding the face region Af detected outside the specific region As, it is conceivable to use the face exposure target value to calculate the face exposure correction value for the face region Af that satisfies the condition of the number of detections in FIG. 11B and satisfies the size condition in FIG. 11A. Alternatively, it is also conceivable to use the face exposure target value to calculate the face exposure correction value for the face region, or the like, that satisfies the distance condition of FIG. 11C and the size condition of FIG. 11 A.

3. Moving Image Skin Beautification Effect Function

Next, a moving image skin beautification effect function of the imaging apparatus 1 will be described.

The moving image skin beautification effect function performs a skin beautification effect processing performed at the time of capturing a still image in real time at the time of capturing a moving image.

Here, the skin beautification effect processing means image processing of giving an effect of making the skin look beautiful to the face of the subject, and is performed as, for example, adjustment processing of at least one of brightness, contrast, color reproduction, white balance, or noise reduction, or adjustment processing of a combination of all or some of brightness, contrast, color reproduction, white balance, and noise reduction.

The noise reduction processing includes, for example, a processing of cutting a high-frequency component such as a low pass filter (LPF).

In the following description, as an example, it is assumed that the skin beautification effect processing is noise reduction processing.

In performing the skin beautification effect processing, the face of the subject is detected, but the processing of detecting the face region Af has already been described, and thus overlapping description will be avoided.

Figure 12:
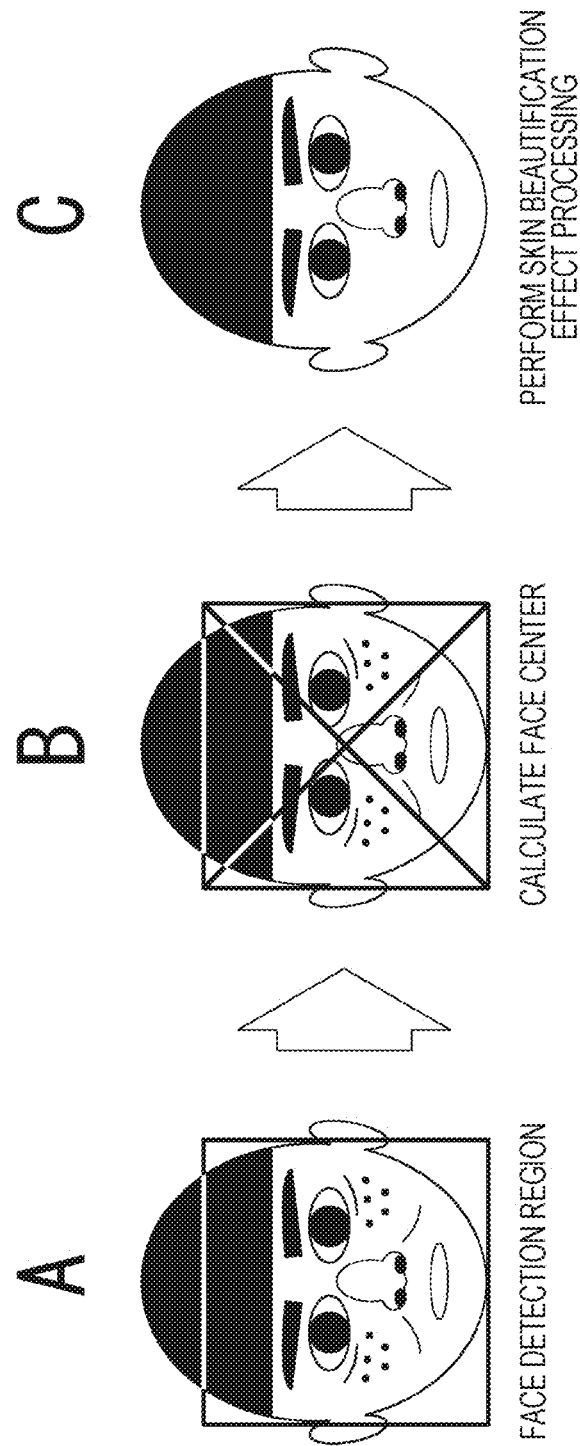
FIG. 12 is a diagram illustrating a flow of skin beautification effect processing at the time of capturing a moving image according to the embodiment.

At the time of capturing a moving image, when the face region Af is detected, the skin beautification effect processing is performed only on the face region Af (see FIGS. 12A to 12C).

At this time, the skin beautification effect processing can be performed by changing the strength of the effect in accordance with the distance from the center of the face region Af, which is illustrated as the face detection region in the drawing. It is effective that the skin beautification effect processing is performed on a cheek portion close to the center of the face. Furthermore, there is a possibility that an unnatural image is formed when a decrease in resolution becomes greater at a position far from the center of the face. In particular, an unnatural image is likely to be formed when the sense of resolution decreases in hair and a chin. Therefore, it is conceivable to reduce the strength of the skin beautification effect as the distance from the center of the face increases.

Figure 13:
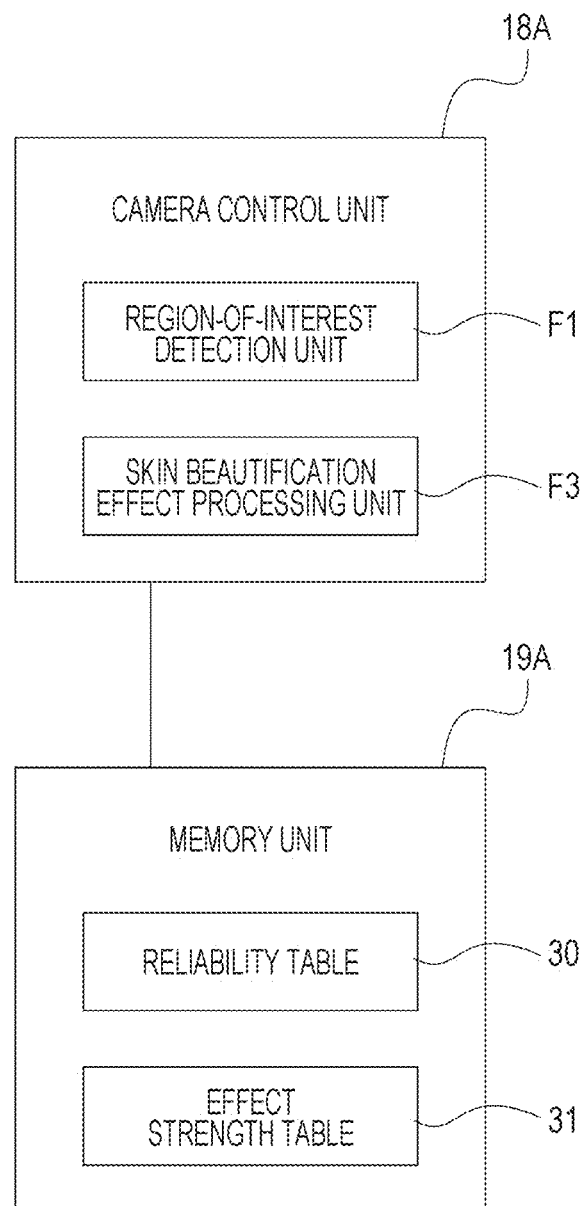
FIG. 13 is an explanatory diagram of a configuration example of an imaging apparatus for implementing skin beautification effect processing according to the embodiment.

FIG. 13 is an explanatory diagram of a configuration example of the imaging apparatus 1 for implementing the skin beautification effect processing of changing the effect strength according to the distance from the center of the face as described above.

Note that a difference with a configuration of the imaging apparatus 1 illustrated in FIG. 1 is that a camera control unit 18A is provided instead of the camera control unit 18, and a memory unit 19A is provided instead of the memory unit 19. Therefore, in FIG. 13, only the camera control unit 18A and memory unit 19A are extracted and illustrated.

Here, the size of the face region Af is not constant, and the size of the face region Af may change during capturing of the moving image. When the size of the face region Af is different, the area of the cheek or the like to which the skin beautification effect processing is to be applied also changes. Therefore, the correspondence relationship between the distance from the center of the face and the strength of the skin beautification effect, such as how far the distance from the center of the face should increase and how much the skin beautification effect should be reduced, should be changed.

Therefore, in the present example, a reliability table 30 in which the reliability corresponding to the distance from the center of the face is set according to the size of the detected face region Af and an effect strength table 31 in which the correspondence relationship between the reliability and the effect strength of the skin beautification effect processing is set are used. In the reliability table 30, information indicating a correspondence relationship between a distance (the number of pixels) from the center of the face region Af and the reliability is stored for each size of the face region Af. Since the strength of the skin beautification effect decreases as the distance from the center of the face region Af increases, the reliability is set to decrease as the distance from the center of the face region Af increases.

Furthermore, in the effect strength table 31, the effect strength is set to be higher as the reliability is higher.

The reliability table 30 and the effect strength table 31 are stored in the memory unit 19A, and the camera control unit 18A can refer to information contents of the reliability table 30 and the effect strength table 31.

The camera control unit 18A has a function as a skin beautification effect processing unit F3 together with the region-of-interest detection unit F1 described above.

The skin beautification effect processing unit F3 performs skin beautification effect processing on the face region Af detected by the region-of-interest detection unit F1. Specifically, for the detected face region Af, the skin beautification effect processing unit F3 obtains the effect strength for each pixel on the basis of the reliability table 30 and the effect strength table 31, and performs the skin beautification effect processing according to the obtained effect strength.

Figure 14:
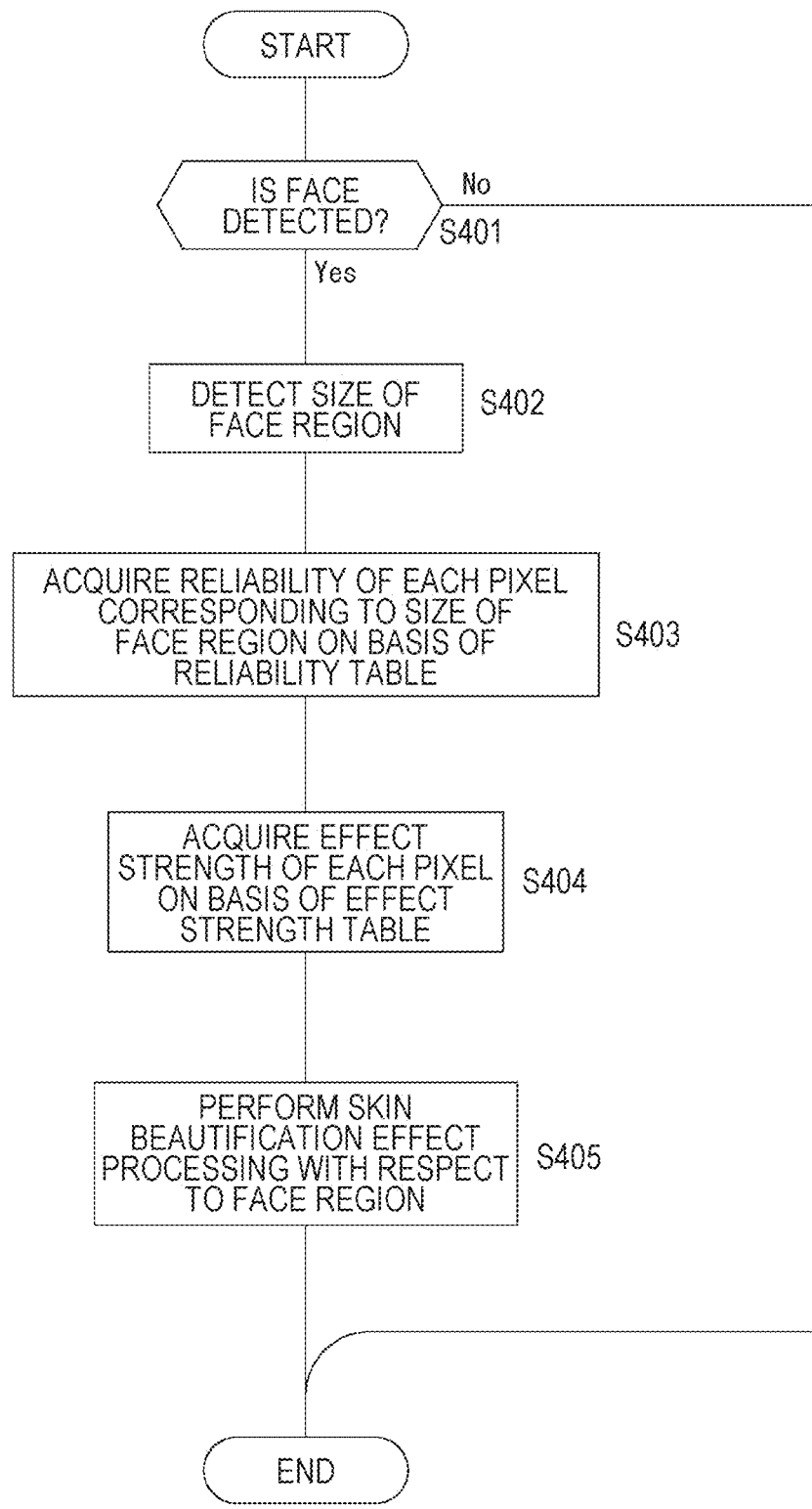
FIG. 14 is a flowchart illustrating an example of a processing procedure for implementing skin beautification effect processing according to the embodiment.

FIG. 14 is a flowchart of processing executed by the camera control unit 18A as the skin beautification effect processing unit F3. Note that the camera control unit 18A repeatedly executes a series of processing illustrated in FIG. 14 for each frame of the captured image.

First, as face detection determination processing in step S401, the camera control unit 18A determines whether or not the face region Af is detected from the captured image by the region-of-interest detection unit F1. When the face region Af is not detected, the camera control unit 18A ends the processing illustrated in FIG. 14.

When the face region Af is detected, the camera control unit 18A causes the processing to proceed to step S402 and detects the size of the face region. That is, the size of the detected face region Af is detected.

In step S403 subsequent to step S402, the camera control unit 18A acquires the reliability of each pixel according to the size of the face region on the basis of the reliability table 30. That is, the reliability of each pixel of the face region Af is acquired with reference to the correspondence relationship information corresponding to the size of the detected face region Af from the correspondence relationship information stored for each face size in the reliability table 30, that is, the information indicating the correspondence relationship between the distance from the center of the face region Af and the reliability.

In step S404 subsequent to step S403, the camera control unit 18A acquires the effect strength of each pixel on the basis of the effect strength table 31. That is, the corresponding enhancement strength is acquired for each pixel from the effect strength table 31 on the basis of the reliability of each pixel acquired in step S403.

Then, in step S405 subsequent to step 3404, as the skin beautification effect processing for the face region Af, the skin beautification effect processing corresponding to the effect strength acquired in step S404 is performed on the face region Af.

The camera control unit 18A ends the series of processing illustrated in FIG. 14 when the processing in step S405 is executed.

Through the processing as described above, the skin beautification effect processing can be appropriately performed on the face region Af even in a case where the size of the face region Af changes during capturing of the moving image.

Here, in the skin beautification effect processing, it is also conceivable to apply a smoothing filter in a time direction with a timing when the face region Af is lost or a timing when the face region Af is detected as a trigger.

Figure 15:
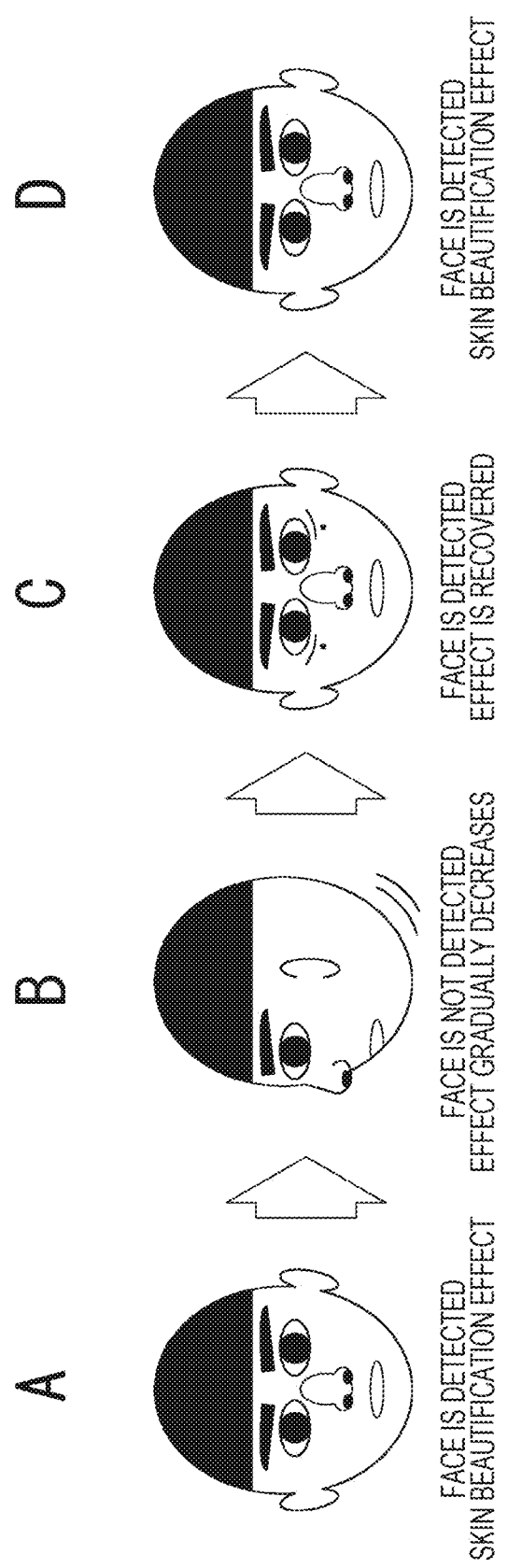
FIG. 15 is an explanatory diagram illustrating smoothing processing of the skin beautification effect processing according to the embodiment.

Specifically, the skin beautification effect processing is performed in the frame in which the face region Af is detected as illustrated in FIG. 15A, and after that, the skin beautification effect processing is performed such that the skin beautification effect gradually decreases in the time direction in the frame in which the face region Af is not detected due to the face facing sideways or the like as illustrated in FIG. 15B. Moreover, after the face is detected again as illustrated in FIG. 15C, the skin beautification effect is gradually recovered (the effect strength is gradually increased) as illustrated as the transition from FIG. 15C to FIG. 15D.

At this time, the target of the smoothing processing may be at least one of brightness, contrast, color reproduction, white balance, or noise reduction, or a combination of all or some of brightness, contrast, color reproduction, white balance, and noise reduction.

Figure 16:
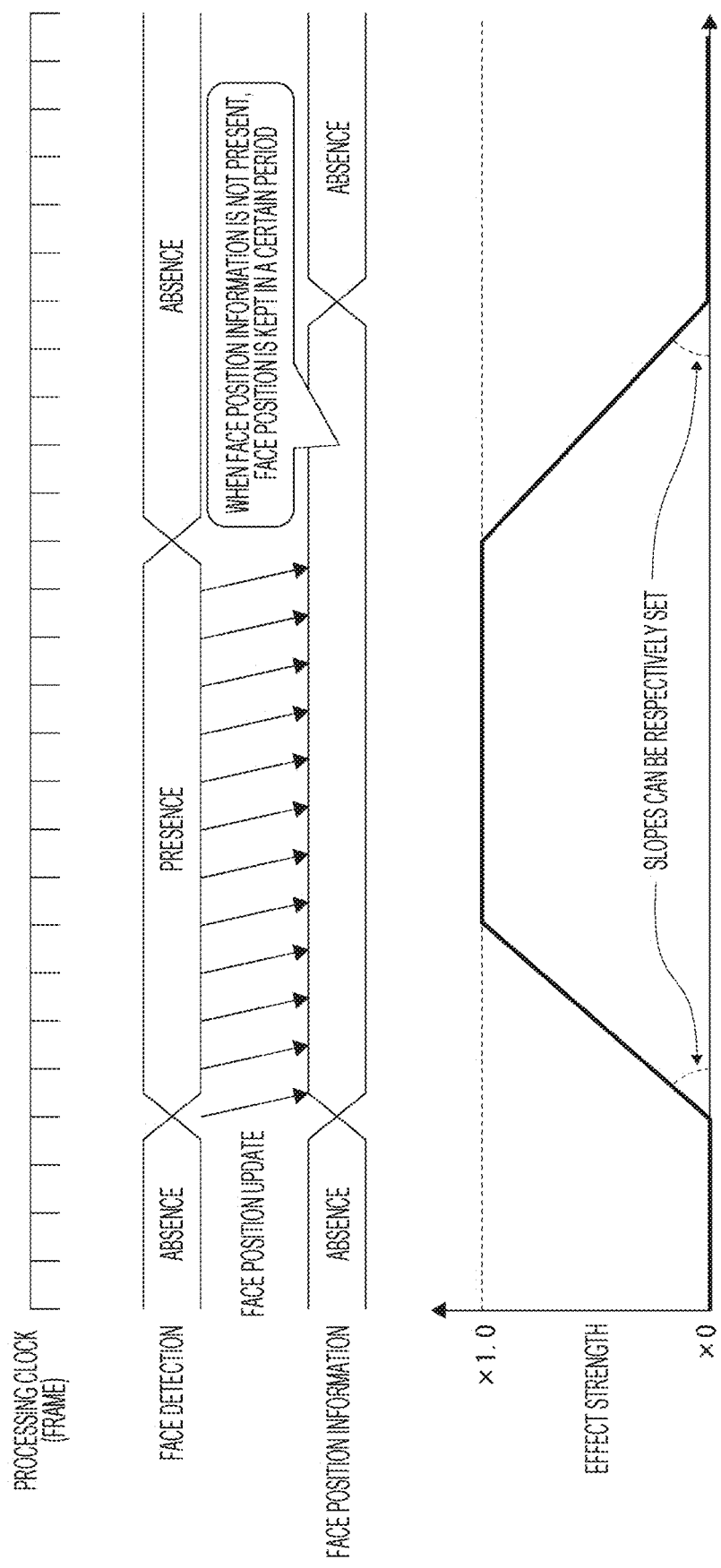
FIG. 16 is a timing chart of smoothing processing according to the embodiment.

FIG. 16 illustrates a timing chart of the smoothing processing as described above.

As illustrated in the drawing, in a predetermined number of frames after the frame in which the face region Af is detected, the effect strength of the skin beautification effect processing is gradually increased. During the detection of the face region Af, the skin beautification effect processing is performed on the position of the face region Af detected for each frame.

Furthermore, in the frames after the frame in which the face region Af is lost, the effect strength of the skin beautification effect processing is gradually reduced while the position of the target region of the skin beautification effect processing is kept at the position immediately before the face region is lost.

Note that the slope of the effect strength when the effect strength gradually changes in the smoothing processing can be arbitrarily set. At this time, the slope of the effect strength can be common or different on an increasing side of the effect strength (smoothing from the frame in which the face region Af is detected) and a decreasing side of the effect strength (smoothing from the frame in which the face region Af is lost).

By the way, regarding the skin beautification effect, the optimum effect strength is different between the still image and the moving image, and thus it is also conceivable to perform the skin beautification effect processing with independent effect strength.

FIGS. 17A to 17D are explanatory diagrams of the strength of the skin beautification effect, and illustrate examples in which the skin beautification effect is gradually enhanced in order of FIG. 17A, FIG. 17B, FIG. 17C, and FIG. 17D.

In the case of the still image, the face of the subject is stationary, and in the moving image, the face of the subject moves to some extent, and thus the optimum strength of the skin beautification effect is different. Specifically, in the case of the moving image, the skin beautification effect tends to be difficult to perceive unless the effect strength is further increased. Therefore, in the case of the moving image, the skin beautification effect processing with the effect strength higher than that in the case of the still image is performed. For example, in a case where there are three settings of the strength of the skin beautification effect of the moving image and the still image, for example, "strong", "weak", and "OFF", when comparing the "strong" setting of the strength of the skin beautification effect in the moving image with the "strong" setting of the strength of the skin beautification effect in the still image, the strength of the skin beautification effect in the moving image is set to be stronger than the strength of the skin beautification effect in the still image. The same applies to the "weak" setting of the strength of the skin beautification effect. In such a case of the same setting, it is preferable to set the strength of the skin beautification effect in the moving image to be stronger than the strength of the skin beautification effect in the still image.

Furthermore, in the skin beautification effect processing, not only ON/OFF but also an effect amount corresponding to user's preference can be set.

Note that, regarding the skin beautification effect processing, it is also conceivable to similarly apply the keeping control for the face AE described above. Specifically, for at least one of brightness, contrast, color reproduction, white balance, or noise reduction, or a combination of all or some of brightness, contrast, color reproduction, white balance, and noise reduction, adjustment processing based on a correction value calculated on the basis of an appropriate value of the face region and an appropriate value of the entire composition is performed.

Here, the skin beautification effect processing can also be controlled on the basis of imaging status information indicating an imaging status.

The imaging status information includes selfie determination information indicating whether or not selfie is being taken.

Furthermore, an example of the control of the skin beautification effect processing includes switching control between ON and OFF of the skin beautification effect processing, or determination control of the strength of the skin beautification effect.

When it is determined that the user is taking a selfie, the skin beautification effect processing is set to ON or the strength of the skin beautification effect is increased.

Here, "increasing the strength of the skin beautification effect" indicates that "increasing the strength of the skin beautification effect to be higher than a predetermined value" or "increasing the strength of the skin beautification effect to be higher when it is determined that the selfie is being taken than when it is determined that selfie is not being taken".

On the other hand, when it is determined that the user is not taking a selfie, the skin beautification effect processing is set to OFF or the strength of the skin beautification effect is decreased.

Here, "decreasing the strength of the skin beautification effect" indicates that "decreasing the strength of the skin beautification effect to be lower than a predetermined value" or "decreasing the strength of the skin beautification effect to be lower when it is determined that the selfie is not being taken than when it is determined that selfie is being taken".

Examples of the selfie determination information include information according to the following "Information example 1" to "Information example 8". However, the control of the skin beautification effect processing may be performed on the basis of only any one of the information of "information example 1" to "information example 8", or the control of the skin beautification effect processing may be performed on the basis of a plurality of pieces of selfie determination information.

"Information example 1" is imaging apparatus fixation determination information indicating whether or not the imaging apparatus 1 is fixed.

The imaging apparatus fixation determination information includes the following information.

<1> Tripod Connection Status Information Indicating Whether or not Imaging Apparatus is Connected to Tripod In a case where the tripod connection status information indicates that the imaging apparatus is connected to the tripod, the skin beautification effect processing is set to ON or the strength of the skin beautification effect is increased.

In a case where the tripod connection status information indicates that the imaging apparatus is connected to the tripod, the skin beautification effect processing is set to OFF or the strength of the skin beautification effect is decreased.

<2> Image Change Information Indicating Change in Captured Image

In a case where the image change information indicates that a value indicating the change in the captured image is equal to or less than a predetermined value, the skin beautification effect processing is set to ON or the strength of the skin beautification effect is increased.

In a case where the image change information indicates that a value indicating the change in the captured image is equal to or greater than a predetermined value, the skin beautification effect processing is set to OFF or the strength of the skin beautification effect is decreased.

Here, the change in the captured image is determined on the basis of, for example, a correlation between the current frame and the past frame (for example, a frame that is temporally one frame before). In a case where the correlation is equal to or greater than a certain value, it is determined that the change in the image is within a threshold, and in a case where the correlation is less than a certain value, it is determined that the change in the image is greater than a threshold.

<3> Imaging Apparatus Orientation Information Indicating Orientation of Imaging Apparatus A change in the orientation of the imaging apparatus 1 is detected using a gyro sensor or the like.

In a case where the imaging apparatus orientation information indicates that the change in the orientation of the imaging apparatus 1 is equal to or less than a predetermined value, the skin beautification effect processing is set to ON or the strength of the skin beautification effect is increased.

In a case where the imaging apparatus orientation information indicates that the change in the orientation of the imaging apparatus is equal to or less than a predetermined value, the skin beautification effect processing is set to OFF or the strength of the skin beautification effect is decreased.

"Information example 2" is line-of-sight information indicating a line-of-sight of the subject.

In a case where the line-of-sight information indicates that a change in the line-of-sight of the subject is equal to or less than a predetermined value, the skin beautification effect processing is set to ON or the strength of the skin beautification effect is increased.

In a case where the line-of-sight information indicates that a change in the line-of-sight of the subject is equal to or less than a predetermined value, the skin beautification effect processing is set to OFF or the strength of the skin beautification effect is decreased.

"Information example 3" is display unit direction information indicating a direction of the display panel 101 of the imaging apparatus 1.

As the type of the display panel 101 of the imaging apparatus 1, there are the vari-angle type described above and a tilt type.

In a case where the display unit direction information indicates that the direction of the display panel 101 is on the lens side of the imaging apparatus 1 (in a case where the display panel 101 is opened laterally), the skin beautification effect processing is set to ON or the strength of the skin beautification effect is increased.

In a case where the display unit direction information indicates that the direction of the display panel 101 is on a side opposite to the lens of the imaging apparatus 1 (in a case where the display panel 101 is at a normal position), the skin beautification effect processing is set to OFF or the strength of the skin beautification effect is decreased.

"Information example 4" is sound directivity information indicating sound directivity.

The sound directivity acquired by one or a plurality of microphones provided in the imaging apparatus 1 can be used.

In a case where the sound directivity information indicates that a change in the sound directivity of the subject is equal to or less than a predetermined value, the skin beautification effect processing is set to ON or the strength of the skin beautification effect is increased.

In a case where the sound directivity information indicates that a change in the sound directivity of the subject is equal to or greater than a predetermined value, the skin beautification effect processing is set to OFF or the strength of the skin beautification effect is decreased.

Note that sound source position direction information indicating a direction of a sound source position can also be used as information based on the sound. In a case where it is determined that a change amount of the position of the sound source is equal to or less than a predetermined amount on the basis of the sound source position direction information, the skin beautification effect processing is set to ON or the strength of the skin beautification effect is increased. On the other hand, in a case where it is determined that a change amount of the position of the sound source is equal to or greater than a predetermined amount on the basis of the sound source position direction information, the skin beautification effect processing is set to OFF or the strength of the skin beautification effect is decreased.

"Information example 5" is face position information indicating a position of the face of the subject in the captured image.

The position of the face of the subject in the captured image can be detected, and a change in the position of the detected face in the captured image can be used.

In a case where the face position information indicates that a change in the position of the face of the subject in the captured image is equal to or less than a predetermined value, the skin beautification effect processing is set to ON or the strength of the skin beautification effect is increased.

In a case where the face position information indicates that a change in the position of the face of the subject in the captured image is equal to or less than a predetermined value, the skin beautification effect processing is set to OFF or the strength of the skin beautification effect is decreased.

"Information example 6" is face frame size information indicating a size of the face frame of the subject in the captured image.

In a case where the face frame size information indicates that the size of the face frame in the captured image is equal to or greater than a predetermined value, the skin beautification effect processing is set to ON or the strength of the skin beautification effect is increased.

In a case where the face frame size information indicates that the size of the face frame in the captured image is equal to or less than a predetermined value, the skin beautification effect processing is set to OFF or the strength of the skin beautification effect is decreased.

"Information example 7" is focus target distance information indicating a distance between a focus target and the imaging apparatus 1.

When a selfie is taken, an imaging apparatus is held by hand or a selfie stick is used. In such a case, the distance between the imaging apparatus and the subject is a distance in a predetermined range corresponding to the selfie in many cases. By using this, in a case where the focus target distance information indicates that the distance between the focus target and the imaging apparatus is a distance in a predetermined range, it is determined that the selfie is being taken.

For example, a case where it is indicated that a distance in a predetermined range is A cm to B cm indicates a case where a distance outside a predetermined range is shorter than A cm or longer than B cm.

Furthermore, a case where a distance in a predetermined range indicates a distance equal to or less than a predetermined distance indicates a case where a distance outside a predetermined range is longer than a predetermined distance.

In a case where the focus target distance information indicates that a distance to the subject to be focused is a distance in a predetermined range, the skin beautification effect processing is set to ON or the strength of the skin beautification effect is increased.

In a case where the focus target distance information indicates that a distance to the subject to be focused is a distance outside a predetermined range, the skin beautification effect processing is set to OFF or the strength of the skin beautification effect is decreased.

"Information example 8" is person information indicating whether or not the subject is a specific person.

The person information indicates that the subject is a specific person in a case where the face registered on the basis of a registered face information registered in the imaging apparatus 1 and the face of the subject match with each other. In addition, in a case where the face of the person is automatically determined from the face information, the person information indicates that the subject is a specific person (for example, the owner of the imaging apparatus 1). The case of automatically determining the face of the person from the face information includes, for example, a case of generating face information that is information of the face of the person from information of the subject in the captured image in the past and determining whether or not the face of the subject is the face of the specific person from the face information.

In a case where the person information indicates that a person is a specific person, the skin beautification effect processing is set to ON or the strength of the skin beautification effect is increased.

In a case where the person information indicates that a person is not a specific person, the skin beautification effect processing is set to OFF or the strength of the skin beautification effect is decreased.

Furthermore, the control of the skin beautification effect processing can also be performed on the basis of a determination result as to whether or not the imaging apparatus 1 is in a state of being placed to perform imaging (imaging in a state of being placed on a still object). Here, whether or not the imaging apparatus is in a state of being placed to perform imaging can be determined using the imaging apparatus fixation determination information in "Information example 1" described above. Furthermore, in a case where a hand shake correction function is provided, it is also conceivable to performs a determination on the basis of whether or not a hand shake correction is performed.

In a case where it is determined that the imaging apparatus 1 is in a state of being placed to perform imaging, the skin beautification effect processing is set to ON or the strength of the skin beautification effect is increased (since the imaging apparatus 1 does not move, an afterimage is less likely to occur). On the other hand, in a case where it is determined that the imaging apparatus 1 is not in a state of being placed to perform imaging, the skin beautification effect processing is set to OFF or the strength of the skin beautification effect is decreased (since the imaging apparatus 1 moves, an afterimage is likely to occur).

4. Modification Example

Here, the embodiment is not limited to the specific examples described above, and various configurations as a modification example can be adopted.

For example, in the above-described description, the difference value between the entire exposure target value before the time of the face region lost and the face exposure target value before the time of the face region lost is obtained as the face exposure correction value, but the face exposure correction value can also be obtained as a ratio instead of the difference value between the entire exposure target value and the face exposure target value. That is, the face exposure correction value can be obtained as a ratio between the entire exposure target value before the time of the face region lost and the face exposure target value before the time of the face region lost, for example, a value of ["face exposure target value before time of face region lost"/"entire exposure target value before time of face region lost"]. In this case, the correction in the keeping period (a predetermined period after the face region lost) is only required to be performed by multiplying the entire exposure target value by the face exposure correction value as the ratio.

As described above, the face exposure correction value may be ratio instead of the difference between the entire exposure target value before the time of the face region lost and the face exposure target value before the time of the face region lost. In view of this point, the face exposure correction value can be conceptually defined as follows.

That is, a "specific numerical relationship" between the entire exposure target value after the face region is lost and the entire exposure target value corrected with the exposure correction value can be defined to be obtained so as to be equivalent to a "specific numerical relationship" between the entire exposure target value before the time of the face region lost and the face exposure target value before the time of the face region lost.

The "specific numerical relationship" mentioned herein means a specific numerical relationship among numerical relationships between two numerical values, and the "numerical relationship" means a numerical relationship such as a difference between two numerical values, a ratio between two numerical values.

Furthermore, the term "equivalent" mentioned herein refers to a concept including not only strict coincidence but also falling within a predetermined error range.

Furthermore, in the above description, it is assumed that the keeping period (predetermined period) in which the correction with the face exposure correction value is performed is fixed, but the keeping period may be a variable period.

For example, the keeping period can be variable according to the size of the face region Af. In this case, the camera control unit 18 (exposure control unit F2) changes the keeping period on the basis of the size of the face region Af detected by the region-of-interest detection unit F1.

For example, in a case where the size of the face region Af is small, the region other than the face region Af is dominant as the composition, and when the keeping period, that is, the exposure control period using the face exposure correction value is long, there is a possibility that the period in which the exposure of the region other than the face region Af is not appropriate is long. In other words, there is a possibility that an unnatural exposure state continues for a long time as the entire composition. When the keeping period is changed according to the size of the face region Af as described above, the keeping period can be shortened in a case where the size of the face region Af is small, and it is possible to prevent an unnatural exposure state as the entire composition from continuing for a long time.

Therefore, as the exposure control after the lost of the face region Af, appropriate exposure control according to the size of the face region Af can be implemented.

Alternatively, the keeping period can be variable according to the number of the face regions Af. In this case, the camera control unit 18 (exposure control unit F2) changes the keeping period on the basis of the number of the face regions Af detected by the region-of-interest detection unit F1.

For example, in a case where the number of the face regions Af is small, the region other than the face region Af is dominant as the composition, and when a predetermined period, that is, the exposure control period using the face exposure correction value is long, there is a possibility that the period in which the exposure of the region other than the face region Af is not appropriate is long. In other words, there is a possibility that an unnatural exposure state continues for a long time as the entire composition. When the keeping period is changed according to the number of the face regions Af as described above, the keeping period can be shortened in a case where the number of the face regions Af is small, and it is possible to prevent an unnatural exposure state as the entire composition from continuing for a long time.

Therefore, as the exposure control after the lost of the face region Af, appropriate exposure control according to the number of the face regions Af detected can be implemented.

Furthermore, the keeping period can be variable according to the number of times of the lost of the face region Af within a certain time. In this case, the camera control unit 18 (exposure control unit F2) changes the keeping period on the basis of the number of times of the lost of the face region Af within a certain time in the past.

For example, the fact that the number of times of the lost of the face region Af within a certain time is great means that the frequency of turning the face backward or turning around the face is high, and it can be said that the lost face region Af is highly likely to be detected again immediately after the lost of the face region Af. According to the above-described configuration, the keeping period, that is, the exposure control period using the face exposure correction value can be shortened corresponding to the case where the frequency of the face region lost is high as described above.

Therefore, it is possible to prevent the exposure control using the face exposure correction value from being unnecessarily continued for a long time after the face region Af is lost.

Moreover, the keeping period can be variable according to the user's operation. That is, in this case, the camera control unit 18 (exposure control unit F2) changes the keeping period on the basis of, for example, an input operation such as a menu operation by the user.

Therefore, the duration of the exposure control using the face exposure correction value after the face region Af is lost can be set according to the user's preference.

Therefore, the function of the exposure control can be improved.

Furthermore, it is also conceivable that the keeping period is variable according to, for example, the blurring width and acceleration of the face within a certain time, is variable according to whether the scene for which imaging is performed is indoor or outdoor, or is variable according to the stability (for example, held by the hand or fixed to the tripod) of the body of the imaging apparatus 1.

Furthermore, in the above description, the configuration in which the region-of-interest detection unit F1 is provided in the imaging apparatus 1 has been described as an example. However, in the present technology, the imaging control apparatus including the exposure control unit F2 is not limited to the configuration including the region-of-interest detection unit F1, and may adopt a configuration not including the region-of-interest detection unit F1.

Furthermore, in the above description, it is assumed that the frame in which the region of interest is to be detected and the frame to be subjected to photometry for obtaining the exposure target value coincide with each other, but these frames may be different frames and may be synchronized at least in terms of timing.

Furthermore, in the above description, an example has been described in which the photometry for exposure control is performed on the basis of a captured image captured by the imaging element 12a. However, the photometry can also be performed on the basis of an output of a photometric sensor provided separately from a sensor for obtaining a captured image.

5. Program

The imaging control apparatus (imaging apparatus 1) as the embodiment has been described above, but the program of the embodiment is a program that causes a computer device such as a CPU to execute processing of the imaging apparatus 1.

The program according to the embodiment is a program that can be read by a computer device, and causes the computer device to implement the following function as a function related to exposure control performed on the basis of information of a region of interest detected from a captured image by a region-of-interest detection unit.

That is, as the function, in a case where the region of interest is detected from the captured image, exposure control is performed in which a region-of-interest exposure target value calculated on the basis of a region-of-interest photometric value obtained from a first photometric region including at least a region of interest in an input frame is set as an exposure control value, in a case where the region of interest is not detected from the captured image, exposure control is performed in which a set region exposure target value calculated on the basis of a set region photometric value obtained from a second photometric region determined in advance in the input frame is set as the exposure control value, and in a predetermined period in which the region of interest is not detected continuously from the time of the region-of-interest lost in which the region of interest is not detected from the captured image, an exposure correction value is obtained on the basis of the region-of-interest exposure target value before the time of the region-of-interest lost, and then exposure control is performed with the exposure control value obtained by correcting the set region exposure target value with the exposure correction value.

That is, this program corresponds to, for example, a program causing the computer device to execute the processing described in FIGS. 7, 8, 10, and the like.

Such a program can be stored in advance in a storage medium readable by the computer device, for example, a ROM, a hard disk drive (HDD), a solid state drive (SSD), or the like. Furthermore, the program can be temporarily or permanently stored in a removable storage medium such as a semiconductor memory, a memory card, an optical disk, a magneto-optical disk, or a magnetic disk. Furthermore, such a removable storage medium can be provided as so-called package software.

Furthermore, such a program can be installed from the removable storage medium to a personal computer or the like, or can be downloaded from a download site to a required information processing apparatus such as a smartphone via a network such as a LAN or the Internet.

6. Summary of Embodiments

As described above, the imaging control apparatus (imaging apparatus 1) as the embodiment includes the exposure control unit (F2: camera control unit 18) that performs exposure control on the basis of the information of the region of interest detected from the captured image by the region-of-interest detection unit (F1).

Then, the exposure control unit performs exposure control in which a region-of-interest exposure target value calculated on the basis of a region-of-interest photometric value obtained from a first photometric region including at least a region of interest in an input frame is set as an exposure control value, in a case where the region of interest is detected from the captured image; performs exposure control in which a set region exposure target value calculated on the basis of a set region photometric value obtained from a second photometric region determined in advance in the input frame is set as an exposure control value, in a case where the region of interest is not detected from the captured image; and obtains an exposure correction value on the basis of the region-of-interest exposure target value before the time of the region-of-interest lost and performs exposure control with an exposure control value obtained by correcting the set region exposure target value with the exposure correction value in a predetermined period in which the region of interest is not detected continuously from the time of the region-of-interest lost in which the region of interest is not detected from the captured image.

According to the above-described configuration, for example, in a case where the exposure control is performed such that the region of interest has appropriate brightness as in the face AE, when the region of interest is lost, in a predetermined period after that, the exposure control is performed with the exposure control value obtained by correcting the set region exposure target value with the exposure correction value obtained on the basis of the region-of-interest exposure target value before the time of the region-of-interest lost. Since the exposure control value obtained by correcting the set region exposure target value with the exposure correction value based on the region-of-interest exposure target value before the time of the region-of-interest lost is used as the exposure control value within a predetermined period after the region-of-interest lost, when there is no change in the brightness of the entire composition within a predetermined period, even after the region-of-interest lost, the brightness of the subject present in the region of interest can be appropriately maintained, and even when the brightness of the entire composition changes within the predetermined period, it is possible to prevent a situation in which the brightness change of the entire composition cannot be followed as in a case where the AE-lock is performed with the region-of-interest exposure target value before the time of the region-of-interest lost.

Therefore, it is possible to maintain appropriate exposure control even when the region of interest is lost, and it is possible to improve the function of the exposure control of the imaging apparatus.

Furthermore, in the imaging control apparatus as the embodiment, the exposure correction value is a value indicating the relationship between the set region exposure target value before the time of the region-of-interest lost and the region-of-interest exposure target value before the time of the region-of-interest lost.

According to this, in a predetermined period after the region-of-interest lost, the set region exposure target value can be corrected with the exposure target value so as to reproduce the relationship between the set region exposure target value before the time of the region-of-interest lost and the region-of-interest exposure target value before the time of the region-of-interest lost.

Therefore, it is possible to maintain appropriate exposure control even when the region of interest is lost.

Moreover, in the imaging control apparatus as the embodiment, in a predetermined period, the exposure control unit performs exposure control with the exposure correction value obtained so as to make the specific numerical relationship between the set region exposure target value and the set region exposure target value corrected with the exposure correction value equivalent to the specific numerical relationship between the set region exposure target value before the time of the region-of-interest lost and the region-of-interest exposure target value before the time of the region-of-interest lost.

According to the above-described configuration, in a predetermined period after the region-of-interest lost, exposure control is performed such that a specific numerical relationship such as a difference or a ratio between the set region exposure target value and the set region exposure target value corrected with the exposure correction value is equivalent to a specific numerical relationship between the set region exposure target value before the time of region-of-interest lost and the region-of-interest exposure target value before time of the region-of-interest lost (so as to reproduce the relationship).

Therefore, it is possible to maintain appropriate exposure control even when the region of interest is lost.

Furthermore, in the imaging control apparatus as the embodiment, the exposure correction value is a difference value between the set region exposure target value before the time of the region-of-interest lost and the region-of-interest exposure target value before the time of the region-of-interest lost.

According to this, in a predetermined period after the region-of-interest lost, exposure control is performed such that a difference between the set region exposure target value and the set region exposure target value corrected with the exposure correction value is equivalent to a difference between the set region exposure target value before the time of region-of-interest lost and the region-of-interest exposure target value before time of the region-of-interest lost.

Therefore, it is possible to maintain appropriate exposure control even when the region of interest is lost.

Figure 9:
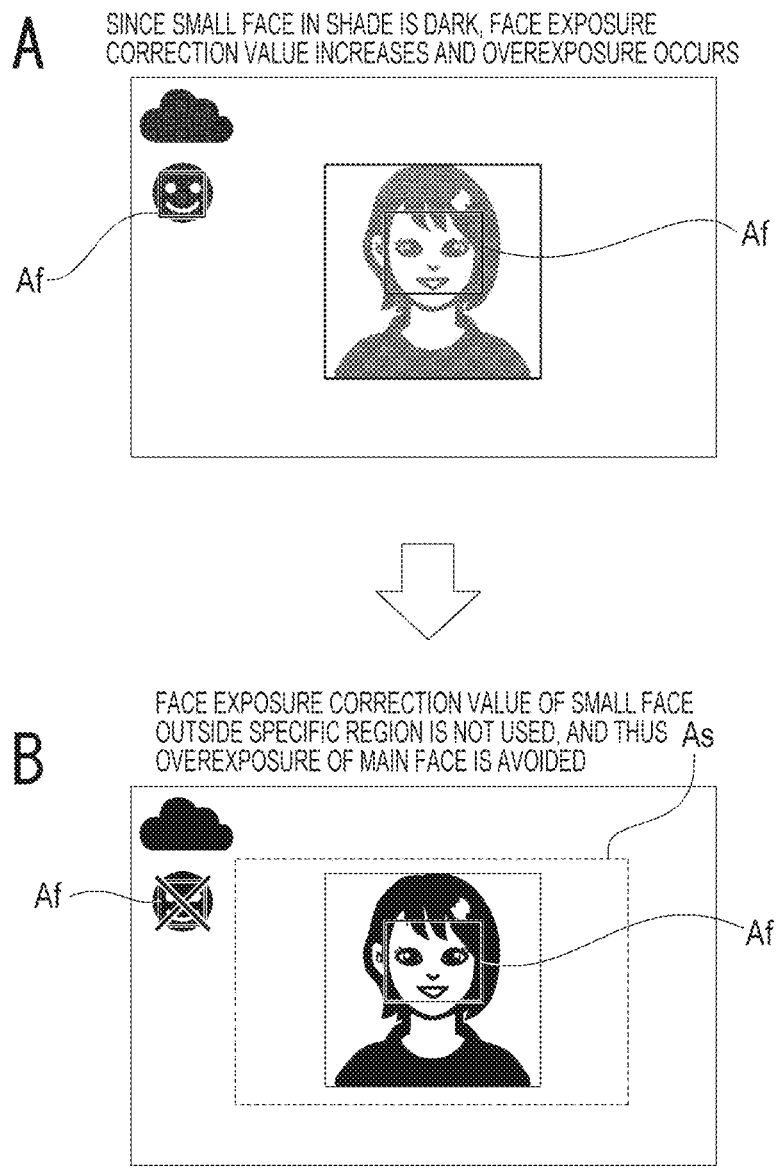
FIG. 9 is an explanatory diagram of exposure control according to a second embodiment.

Furthermore, in the imaging control apparatus as the embodiment, in a case where the regions of interest are detected respectively inside and outside the specific region in the captured image by the region-of-interest detection unit, the exposure control unit calculates the region-of-interest exposure target value used to calculate the exposure correction value on the basis of at least one of the size, number, or position of the detected region of interest (see FIGS. 9 to 11).

Regarding the region of interest detected outside the specific region, in a case where the region size is small, the number of the regions is small, or a distance from the region of interest detected inside the specific region is long, when the exposure target value for the region of interest is considered in calculating the exposure correction value, there is a possibility that the brightness of the subject in the region of interest detected inside the specific region cannot be made appropriate.

According to the above-described configuration, it is possible to prevent the exposure target value of the region of interest detected outside the specific region from being used to calculate the exposure correction value in such a case where there is a possibility, and it is possible to maintain appropriate exposure control even when the region of interest is lost.

Moreover, in the imaging control apparatus as the embodiment, in a case where the size of the region of interest detected outside the specific region is greater than a reference size, the exposure control unit uses the region-of-interest exposure target value calculated for the region of interest to calculate the exposure correction value, and in a case where the size of the region of interest detected outside the specific region is not greater than the reference size, the exposure control unit does not use the region-of-interest exposure target value calculated for the region of interest to calculate the exposure correction value.

According to this, regarding the region of interest detected outside the specific region, in a case where the size of the region of interest is great and the region of interest cannot be ignored in the correction of the set region exposure target value after the region-of-interest lost, the exposure target value of the region of interest can be used to calculate the exposure correction value, and conversely, in a case where the size is small and the region of interest can be ignored in the correction of the set region exposure target value after the region-of-interest lost, the exposure target value of the region of interest can be prevented from being used to calculate the exposure correction value.

Therefore, as the exposure control after the region-of-interest lost, appropriate exposure control according to the size of the region of interest detected outside the specific region can be implemented.

Furthermore, in the imaging control apparatus as the embodiment, the reference size is the size of the region of interest detected inside the specific region.

According to this, whether or not to use the exposure target value of the region of interest detected outside the specific region for calculating the exposure correction value is determined on the basis of the relative size relationship of the region of interest detected inside/outside the specific region.

Therefore, it is possible to prevent an inconvenience such as the fact that the exposure target value of the region of interest is not used to calculate the exposure correction value even though the size of the region of interest detected outside the specific region is greater, and it is possible to implement appropriate exposure control according to the size relationship between the size of the region of interest detected inside the specific region and the size of the region of interest detected outside the specific region.

Furthermore, in the imaging control apparatus as the embodiment, in a case where the number of the regions of interest detected outside the specific region is greater than a threshold, the exposure control unit uses the region-of-interest exposure target value calculated for the region of interest detected outside the specific region to calculate the exposure correction value, and in a case where the number of the regions of interest detected outside the specific region is not greater than the threshold, the exposure control unit does not use the region-of-interest exposure target value calculated for the region of interest detected outside the specific region to calculate the exposure correction value.

According to this, regarding the region of interest detected outside the specific region, in a case where the number of the regions of interest is great and the region of interest outside the specific region cannot be ignored in the correction of the set region exposure target value after the region-of-interest lost, the exposure target value of the region of interest can be used to calculate the exposure correction value, and conversely, in a case where the number of the regions of interest is small and the region of interest outside the specific region can be ignored in the correction of the set region exposure target value after the region-of-interest lost, the exposure target value of the region of interest can be prevented from being used to calculate the exposure correction value.

Therefore, as the exposure control after the region-of-interest lost, appropriate exposure control according to the number of the regions of interest detected outside the specific region can be implemented.

Moreover, in the imaging control apparatus as the embodiment, in a case where, as the region of interest detected outside the specific region, there is the region of interest within a certain distance from the region of interest detected inside the specific region, the exposure control unit uses the region-of-interest exposure target value calculated for the region of interest to calculate the exposure correction value, and in a case where there is not the region of interest within a certain distance from the region of interest detected inside the specific region, the exposure control unit does not use the region-of-interest exposure target value calculated for the region of interest detected outside the specific region to calculate the exposure correction value.

According to this, regarding the region of interest detected outside the specific region, in a case of the region of interest at a distance close to the region of interest inside the specific region, in other words, the region of interest in which a brightness difference with the region of interest inside the specific region is likely to be conspicuous, the brightness difference occurring in a case where the exposure target value of the region of interest is not used to calculate the exposure correction value, the exposure target value of the region of interest can be used to calculate the exposure correction value, and conversely, in a case of the region of interest which is at a distance far from the region of interest inside the specific region and in which the brightness difference is not likely to be conspicuous, the exposure target value of the region of interest can be prevented from being used to calculate the exposure correction value.

Therefore, as the exposure control after the region-of-interest lost, appropriate exposure control according to a separation distance between the region of interest detected inside the specific region and the region of interest detected outside the specific region can be implemented.

Furthermore, in the imaging control apparatus as the embodiment, the exposure control unit changes a predetermined period on the basis of the size of the region of interest detected by the region-of-interest detection unit.

For example, in a case where the size of the region of interest is small, the region other than the region of interest is dominant as the composition, and when the predetermined period, that is, the exposure control period using the exposure correction value is long, there is a possibility that the period in which the exposure of the region other than the region of interest is not appropriate is long. In other words, there is a possibility that an unnatural exposure state continues for a long time as the entire composition. When the predetermined period is changed according to the size of the region of interest as described above, the predetermined period can be shortened in a case where the size of the region of interest is small, and it is possible to prevent an unnatural exposure state as the entire composition from continuing for a long time.

Therefore, as the exposure control after the region-of-interest lost, appropriate exposure control according to the size of the region of interest can be implemented.

Furthermore, in the imaging control apparatus as the embodiment, the exposure control unit changes a predetermined period on the basis of the number of the regions of interest detected by the region-of-interest detection unit.

For example, in a case where the number of the regions of interest is small, the region other than the region of interest is dominant as the composition, and when a predetermined period, that is, the exposure control period using the exposure correction value is long, there is a possibility that the period in which the exposure of the region other than the region of interest is not appropriate is long. In other words, there is a possibility that an unnatural exposure state continues for a long time as the entire composition. When the predetermined period is changed according to the number of the regions of interest as described above, the predetermined period can be shortened in a case where the number of the regions of interest is small, and it is possible to prevent an unnatural exposure state as the entire composition from continuing for a long time.

Therefore, as the exposure control after the region-of-interest lost, appropriate exposure control according to the number of detections of the region of interest can be implemented.

Moreover, in the imaging control apparatus as the embodiment, the exposure control unit changes a predetermined period on the basis of the number of times at which the region of interest is lost in a certain time.

For example, the fact that the number of times of the lost of the region of interest within a certain time is great means that the frequency of turning the face backward or turning around the face is high in a case where the region of interest is a face region of a person, and it can be said that the lost region of interest is highly likely to be detected again immediately after the lost of the region of interest. According to the above-described configuration, the predetermined period, that is, the exposure control period using the exposure correction value can be shortened corresponding to the case where the frequency of the region-of-interest lost is high as described above.

Therefore, it is possible to prevent the exposure control using the exposure correction value from being unnecessarily continued for a long time after the region-of-interest lost.

Furthermore, in the imaging control apparatus as the embodiment, the exposure control unit changes a predetermined period on the basis of the user's operation.

According to this, the duration of the exposure control using the exposure correction value after the region-of-interest lost can be set according to the user's preference.

Therefore, the function of the exposure control can be improved.

Furthermore, an imaging control method as the embodiment is an imaging control method in which an imaging control apparatus, which performs exposure control on the basis of information of a region of interest detected from a captured image by a region-of-interest detection unit, is configured to: perform exposure control in which a region-of-interest exposure target value calculated on the basis of a region-of-interest photometric value obtained from a first photometric region including at least a region of interest in an input frame is set as an exposure control value, in a case where the region of interest is detected from the captured image; perform exposure control in which a set region exposure target value calculated on the basis of a set region photometric value obtained from a second photometric region determined in advance in the input frame is set as the exposure control value, in a case where the region of interest is not detected from the captured image; and obtain an exposure correction value on the basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

Also with such an imaging control method, it is possible to obtain functions and effects similar to those of the imaging control apparatus as the above-described embodiment.

Furthermore, a program as the embodiment is a program readable by a computer device, the program causing the computer device to implement, as functions for exposure control performed on the basis of information of a region of interest detected from a captured image by a region-of-interest detection unit, functions of: performing exposure control in which a region-of-interest exposure target value calculated on the basis of a region-of-interest photometric value obtained from a first photometric region including at least a region of interest in an input frame is set as an exposure control value, in a case where the region of interest is detected from the captured image; performing exposure control in which a set region exposure target value calculated on the basis of a set region photometric value obtained from a second photometric region determined in advance in the input frame is set as the exposure control value, in a case where the region of interest is not detected from the captured image; and obtaining an exposure correction value on the basis of the region-of-interest exposure target value before a time of region-of-interest lost, and then performing exposure control with the exposure control value obtained by correcting the set region exposure target value with the exposure correction value, in a predetermined period in which the region of interest is not detected continuously from the time of the region-of-interest lost in which the region of interest is not detected from the captured image.

With such a program, the computer device can be caused to function as the imaging control apparatus as the above-described embodiment.

Note that the effects described in the present specification are merely examples and are not limited, and other effects may be provided.

7. Present Technology

Note that the present technology can also have the following configurations.

(1)

An imaging control apparatus including an exposure control unit configured to perform exposure control on the basis of information of a region of interest detected from a captured image by a region-of-interest detection unit, in which the exposure control unit is configured to:

perform exposure control in which a region-of-interest exposure target value calculated on the basis of a region-of-interest photometric value obtained from a first photometric region including at least a region of interest in an input frame is set as an exposure control value, in a case where the region of interest is detected from the captured image;

perform exposure control in which a set region exposure target value calculated on the basis of a set region photometric value obtained from a second photometric region determined in advance in the input frame is set as the exposure control value, in a case where the region of interest is not detected from the captured image; and obtain an exposure correction value on the basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

(2)

The imaging control apparatus according to (1), in which the exposure correction value is a value indicating a relationship between the set region exposure target value before the time of the region-of-interest lost and the region-of-interest exposure target value before the time of the region-of-interest lost.

(3)

The imaging control apparatus according to (2),
in which in the predetermined period, the exposure control unit performs exposure control with the exposure correction value obtained so as to make a specific numerical relationship between the set region exposure target value and the set region exposure target value corrected with the exposure correction value equivalent to the specific numerical relationship between the set region exposure target value before the time of the region-of-interest lost and the region-of-interest exposure target value before the time of the region-of-interest lost.

(4)

The imaging control apparatus according to (2) or (3),
in which the exposure correction value is a difference value between the set region exposure target value before the time of the region-of-interest lost and the region-of-interest exposure target value before the time of the region-of-interest lost.

(5)

The imaging control apparatus according to any one of (1) to (4),
in which in a case where the regions of interest are detected respectively inside and outside a specific region in the captured image by the region-of-interest detection unit, the exposure control unit calculates the region-of-interest exposure target value used to calculate the exposure correction value on the basis of at least one of a size of the detected region of interest, the number of the detected regions of interest, or a position of the detected region of interest.

(6)

The imaging control apparatus according to (5),
in which in a case where the size of the region of interest detected outside the specific region is greater than a reference size, the exposure control unit uses the region-of-interest exposure target value calculated for the region of interest to calculate the exposure correction value, and in a case where the size of the region of interest detected outside the specific region is not greater than the reference size, the exposure control unit does not use the region-of-interest exposure target value calculated for the region of interest to calculate the exposure correction value.

(7)

The imaging control apparatus according to (6),
in which the reference size is a size of the region of interest detected inside the specific region.

(8)

The imaging control apparatus according to any one of (5) to (7),
in which in a case where the number of the regions of interest detected outside the specific region is greater than a threshold, the exposure control unit uses the region-of-interest exposure target value calculated for the region of interest detected outside the specific region to calculate the exposure correction value, and in a case where the number of the regions of interest detected outside the specific region is not greater than the threshold, the exposure control unit does not use the region-of-interest exposure target value calculated for the region of interest detected outside the specific region to calculate the exposure correction value.

(9)

The imaging control apparatus according to any one of (5) to (8),
in which in a case where, as the region of interest detected outside the specific region, there is the region of interest within a certain distance from the region of interest detected inside the specific region, the exposure control unit uses the region-of-interest exposure target value calculated for the region of interest to calculate the exposure correction value, and in a case where there is not the region of interest within a certain distance from the region of interest detected inside the specific region, the exposure control unit does not use the region-of-interest exposure target value calculated for the region of interest detected outside the specific region to calculate the exposure correction value.

(10)

The imaging control apparatus according to any one of (1) to (9),
in which the exposure control unit changes the predetermined period on the basis of the size of the region of interest detected by the region-of-interest detection unit.

(11)

The imaging control apparatus according to any one of (1) to (10),
in which the exposure control unit changes the predetermined period on the basis of the number of the regions of interest detected by the region-of-interest detection unit.

(12)

The imaging control apparatus according to any one of (1) to (11),
in which the exposure control unit changes the predetermined period on the basis of the number of times at which the region of interest is lost within a certain time.

(13)

The imaging control apparatus according to any one of (1) to (12),
in which the exposure control unit changes the predetermined period on the basis of a user's operation.

(14)

An imaging control method
in which an imaging control apparatus, which performs exposure control on the basis of information of a region of interest detected from a captured image by a region-of-interest detection unit, is configured to:
perform exposure control in which a region-of-interest exposure target value calculated on the basis of a region-of-interest photometric value obtained from a first photometric region including at least a region of interest in an input frame is set as an exposure control value, in a case where the region of interest is detected from the captured image;
perform exposure control in which a set region exposure target value calculated on the basis of a set region photometric value obtained from a second photometric region determined in advance in the input frame is set as the exposure control value, in a case where the region of interest is not detected from the captured image; and
obtain an exposure correction value on the basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

(15) A program readable by a computer device, the program causing the computer device to implement,
as functions for exposure control performed on the basis of information of a region of interest detected from a captured image by a region-of-interest detection unit, functions of:
performing exposure control in which a region-of-interest exposure target value calculated on the basis of a region-of-interest photometric value obtained from a first photometric region including at least a region of interest in an input frame is set as an exposure control value, in a case where the region of interest is detected from the captured image;
performing exposure control in which a set region exposure target value calculated on the basis of a set region photometric value obtained from a second photometric region determined in advance in the input frame is set as the exposure control value, in a case where the region of interest is not detected from the captured image; and
obtaining an exposure correction value on the basis of the region-of-interest exposure target value before a time of region-of-interest lost, and then performing exposure control with the exposure control value obtained by correcting the set region exposure target value with the exposure correction value, in a predetermined period in which the region of interest is not detected continuously from the time of the region-of-interest lost in which the region of interest is not detected from the captured image.

REFERENCE SIGNS LIST

1 Imaging apparatus
11 Lens system
12 Imaging element unit
12a Imaging element
13 Camera signal processing unit
14 Recording control unit
15 Display unit
16 Communication unit
17 Operation unit
18, 18A Camera control unit
19, 19A Memory unit
22 Driver unit
23 Sensor unit
24 Power supply unit
24a Battery
F1 Region-of-interest detection unit
F2 Exposure control unit
Af Face region
As Specific region

The invention claimed is:

1. An imaging control apparatus comprising:
an exposure control unit configured to perform exposure control on a basis of information of a region of interest detected from a captured image by a region-of-interest detection unit,
wherein the exposure control unit is configured to:
perform exposure control in which a region-of-interest exposure target value calculated on a basis of a region-of-interest photometric value obtained from a first photometric region including at least a region of interest in an input frame is set as an exposure control value, in a case where the region of interest is detected from the captured image;
perform exposure control in which a set region exposure target value calculated on a basis of a set region photometric value obtained from a second photometric region determined in advance in the input frame is set as the exposure control value, in a case where the region of interest is not detected from the captured image; and
obtain an exposure correction value on a basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

2. The imaging control apparatus according to claim 1, wherein the exposure correction value is a value indicating a relationship between the set region exposure target value before the time of the region-of-interest lost and the region-of-interest exposure target value before the time of the region-of-interest lost.

3. The imaging control apparatus according to claim 2, wherein in the predetermined period, the exposure control unit performs exposure control with the exposure correction value obtained so as to make a specific numerical relationship between the set region exposure target value and the set region exposure target value corrected with the exposure correction value equivalent to the specific numerical relationship between the set region exposure target value before the time of the region-of-interest lost and the region-of-interest exposure target value before the time of the region-of-interest lost.

4. The imaging control apparatus according to claim 2, wherein the exposure correction value is a difference value between the set region exposure target value before the time of the region-of-interest lost and the region-of-interest exposure target value before the time of the region-of-interest lost.

5. The imaging control apparatus according to claim 1, wherein in a case where regions of interest are detected respectively inside and outside a specific region in the captured image by the region-of-interest detection unit, the exposure control unit calculates the region-of-interest exposure target value used to calculate the exposure correction value on a basis of at least one of a size of a detected region of interest, a number of detected regions of interest, or a position of the detected region of interest.

6. The imaging control apparatus according to claim 5, wherein in a case where the size of the region of interest detected outside the specific region is greater than a reference size, the exposure control unit uses the region-of-interest exposure target value calculated for the region of interest to calculate the exposure correction value, and in a case where the size of the region of interest detected outside the specific region is not greater than the reference size, the exposure control unit does not use the region-of-interest exposure target value calculated for the region of interest to calculate the exposure correction value.

7. The imaging control apparatus according to claim 6, wherein the reference size is a size of the region of interest detected inside the specific region.

8. The imaging control apparatus according to claim 5, wherein in a case where the number of detected regions of interest outside the specific region is greater than a threshold, the exposure control unit uses the region-of-interest exposure target value calculated for the region of interest detected outside the specific region to calculate the exposure correction value, and in a case where the number of detected regions of interest outside the specific region is not greater than the threshold, the exposure control unit does not use the region-of-interest exposure target value calculated for the region of interest detected outside the specific region to calculate the exposure correction value.

9. The imaging control apparatus according to claim 5, wherein in a case where, as the region of interest detected outside the specific region, there is the region of interest within a certain distance from the region of interest detected inside the specific region, the exposure control unit uses the region-of-interest exposure target value calculated for the region of interest to calculate the exposure correction value, and in a case where there is not the region of interest within a certain distance from the region of interest detected inside the specific region, the exposure control unit does not use the region-of-interest exposure target value calculated for the region of interest detected outside the specific region to calculate the exposure correction value.

10. The imaging control apparatus according to claim 1, wherein the exposure control unit changes the predetermined period on a basis of a size of the region of interest detected by the region-of-interest detection unit.

11. The imaging control apparatus according to claim 1, wherein the exposure control unit changes the predetermined period on a basis of a number of regions of interest detected by the region-of-interest detection unit.

12. The imaging control apparatus according to claim 1, wherein the exposure control unit changes the predetermined period on a basis of a number of times at which the region of interest is lost within a certain time.

13. The imaging control apparatus according to claim 1, wherein the exposure control unit changes the predetermined period on a basis of determining a user operation.

14. An imaging control method for performing exposure control, the imaging control method comprising:
perform exposure control in which a region-of-interest exposure target value calculated on a basis of a region-of-interest photometric value obtained from a first photometric region including at least a region of interest in an input frame is set as an exposure control value, in a case where the region of interest is detected from a captured image;
perform exposure control in which a set region exposure target value calculated on a basis of a set region photometric value obtained from a second photometric region determined in advance in the input frame is set as the exposure control value, in a case where the region of interest is not detected from the captured image; and
obtain an exposure correction value on a basis of the region-of-interest exposure target value before a time of region-of-interest lost, and then perform exposure control with the exposure control value obtained by correcting the set region exposure target value with the exposure correction value, in a predetermined period in which the region of interest is not detected continuously from the time of the region-of-interest lost in which the region of interest is not detected from the captured image.

15. The imaging control method according to claim 14, wherein the exposure correction value is a value indicating a relationship between the set region exposure target value before the time of the region-of-interest lost and the region-of-interest exposure target value before the time of the region-of-interest lost.

16. The imaging control method according to claim 15, wherein in the predetermined period, the exposure control is performed with the exposure correction value obtained so as to make a specific numerical relationship between the set region exposure target value and the set region exposure target value corrected with the exposure correction value equivalent to the specific numerical relationship between the set region exposure target value before the time of the region-of-interest lost and the region-of-interest exposure target value before the time of the region-of-interest lost.

17. A non-transitory computer readable medium storing a program for performing exposure control, the program being executable by a processor to perform operations comprising:
performing exposure control in which a region-of-interest exposure target value calculated on a basis of a region-of-interest photometric value obtained from a first photometric region including at least a region of interest in an input frame is set as an exposure control value, in a case where the region of interest is detected from a captured image;
performing exposure control in which a set region exposure target value calculated on a basis of a set region photometric value obtained from a second photometric region determined in advance in the input frame is set as the exposure control value, in a case where the region of interest is not detected from the captured image; and
obtaining an exposure correction value on a basis of the region-of-interest exposure target value before a time of region-of-interest lost, and then performing exposure control with the exposure control value obtained by correcting the set region exposure target value with the exposure correction value, in a predetermined period in which the region of interest is not detected continuously from the time of the region-of-interest lost in which the region of interest is not detected from the captured image.

18. The non-transitory computer readable medium according to claim 17, wherein the exposure correction value is a value indicating a relationship between the set region exposure target value before the time of the region-of-interest lost and the region-of-interest exposure target value before the time of the region-of-interest lost.

19. The non-transitory computer readable medium according to claim 18, wherein in the predetermined period, the exposure control is performed with the exposure correction value obtained so as to make a specific numerical relationship between the set region exposure target value and the set region exposure target value corrected with the exposure correction value equivalent to the specific numerical relationship between the set region exposure target value before the time of the region-of-interest lost and the region-of-interest exposure target value before the time of the region-of-interest lost.

* * * * *